United States Patent
Cho et al.

(10) Patent No.: US 9,334,370 B2
(45) Date of Patent: May 10, 2016

(54) POLY(IMIDE-AMIDE) COPOLYMER, ARTICLE INCLUDING POLY(IMIDE-AMIDE) COPOLYMER, AND DISPLAY DEVICE INCLUDING THE ARTICLE

(71) Applicant: SAMSUNG ELECTRONICS CO., LTD., Suwon-si, Gyeonggi-do (KR)

(72) Inventors: Chung Kun Cho, Suwon-si (KR); Mikhail Kovalev, Suwon-si (KR); Dmitry Androsov, Suwon-si (KR); Fedosya Kalinina, Hwaseong-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 14/332,472

(22) Filed: Jul. 16, 2014

(65) Prior Publication Data

US 2015/0152226 A1    Jun. 4, 2015

(30) Foreign Application Priority Data

Dec. 2, 2013    (KR) .................. 10-2013-0148435

(51) Int. Cl.
| | | |
|---|---|---|
| *C08G 69/08* | (2006.01) | |
| *C08G 69/26* | (2006.01) | |
| *C08F 283/00* | (2006.01) | |
| *C08G 73/14* | (2006.01) | |
| *C08K 3/36* | (2006.01) | |
| *C09D 179/08* | (2006.01) | |
| *B29C 41/00* | (2006.01) | |
| *B29C 41/44* | (2006.01) | |
| *B29C 41/46* | (2006.01) | |
| *B29C 41/24* | (2006.01) | |
| *C08K 3/22* | (2006.01) | |
| *B29K 105/24* | (2006.01) | |
| *B29K 79/00* | (2006.01) | |
| *B29L 29/00* | (2006.01) | |
| *B29L 31/34* | (2006.01) | |

(52) U.S. Cl.
CPC .............. *C08G 73/14* (2013.01); *B29C 41/003* (2013.01); *B29C 41/24* (2013.01); *B29C 41/44* (2013.01); *B29C 41/46* (2013.01); *C08K 3/22* (2013.01); *C08K 3/36* (2013.01); *C09D 179/08* (2013.01); *B29K 2079/085* (2013.01); *B29K 2105/24* (2013.01); *B29L 2029/00* (2013.01); *B29L 2031/3475* (2013.01)

(58) Field of Classification Search
None
See application file for complete search history.

(56) References Cited

U.S. PATENT DOCUMENTS

| | | | |
|---|---|---|---|
| 8,399,593 B2 | 3/2013 | Jung et al. | |
| 8,586,689 B2 | 11/2013 | Jung et al. | |
| 2002/0107335 A1* | 8/2002 | Nishihata et al. | ............. 525/418 |
| 2007/0248910 A1* | 10/2007 | Kimura et al. | ............. 430/270.1 |
| 2012/0183730 A1 | 7/2012 | Nakayama et al. | |
| 2014/0243482 A1* | 8/2014 | Park ....................... C08G 73/14 |
| | | | 525/450 |

FOREIGN PATENT DOCUMENTS

| | | |
|---|---|---|
| JP | 2005-146180 A | 6/2005 |
| JP | 2012-150284 A | 8/2012 |
| KR | 1020110047859 A | 5/2011 |
| KR | 1020120083798 A | 7/2012 |
| KR | 1020130031052 A | 3/2013 |

* cited by examiner

*Primary Examiner* — Susannah Chung
*Assistant Examiner* — Robert T Butcher
(74) *Attorney, Agent, or Firm* — Cantor Colburn LLP

(57) ABSTRACT

A poly(imide-amide) copolymer including a structural unit represented by Chemical Formula 1, a structural unit represented by Chemical Formula 2, and a structural unit represented by Chemical Formula 3:

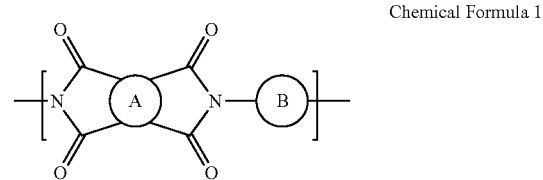

Chemical Formula 1

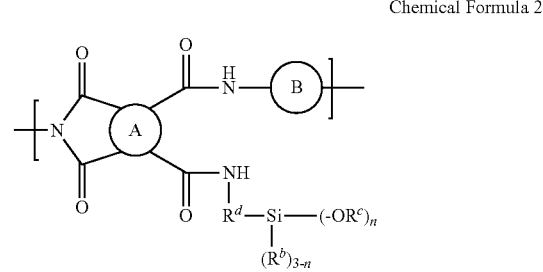

Chemical Formula 2

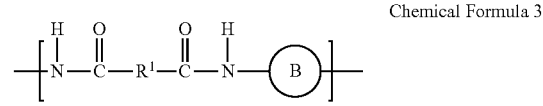

Chemical Formula 3 wherein substituents, groups and variables in Chemical Formulae 1 to 3 are as defined in the specification.

17 Claims, 3 Drawing Sheets

POLY(IMIDE-AMIDE) COPOLYMER, ARTICLE INCLUDING POLY(IMIDE-AMIDE) COPOLYMER, AND DISPLAY DEVICE INCLUDING THE ARTICLE

CROSS-REFERENCE TO RELATED APPLICATION

This application claims priority to Korean Patent Application No. 10-2013-0148435, filed on Dec. 2, 2013, and all the benefits accruing therefrom under 35 U.S.C. §119, the content of which is incorporated herein in its entirety by reference.

BACKGROUND

1. Field

This disclosure relates to a poly(imide-amide) copolymer, an article including the poly(imide-amide) copolymer, and a display device including an article.

2. Description of the Related Art

A colorless transparent material has been researched for diverse purposes such as an optical lens, a functional optical film, and a disk substrate. But as information devices are being further miniaturized and display devices providing higher resolution are developed, more functions and greater performance are desired from the material.

Therefore, there remains a need in a colorless transparent material having excellent transparency, heat resistance, mechanical strength, and flexibility to ensure high resolution.

SUMMARY

An embodiment provides a poly(imide-amide) copolymer having excellent transparency, heat resistance, mechanical strength, flexibility, and chemical resistance.

Another embodiment provides an article including a poly(imide-amide) copolymer having excellent transparency, heat resistance, mechanical strength, flexibility, and chemical resistance.

Yet another embodiment provides a display device including an article including poly(imide-amide) copolymer.

According to an embodiment, provided is a poly(imide-amide) copolymer including a structural unit represented by Chemical Formula 1, a structural unit represented by Chemical Formula 2, and a structural unit represented by Chemical Formula 3:

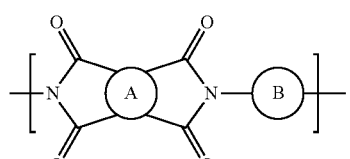

Chemical Formula 1

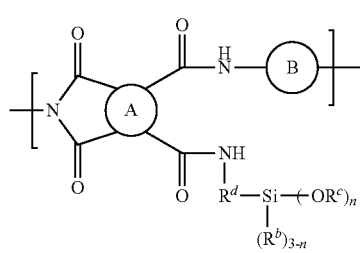

Chemical Formula 2

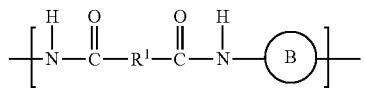

Chemical Formula 3

In Chemical Formulae 1 to 3,

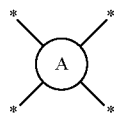

is the same or different in each structural unit, and each is independently represented by Chemical Formula 4:

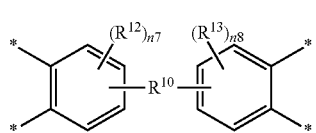

Chemical Formula 4 wherein in Chemical Formula 4, $R^{10}$ is a single bond, a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic group, $R^{12}$ and $R^{13}$ are the same or different and each are independently a halogen, a hydroxyl group, a substituted or unsubstituted C1 to C10 aliphatic organic group, a substituted or unsubstituted C6 to C20 aromatic organic group, an alkoxy group of formula $-OR^{205}$, wherein $R^{205}$ is a C1 to C10 aliphatic organic group, a silyl group of formula $-SiR^{209}R^{210}R^{211}$, wherein $R^{209}$, $R^{210}$, and $R^{211}$ are the same or different and each are independently a hydrogen, or a C1 to C10 aliphatic organic group, and n7 and n8 are the same or different and each are independently an integer ranging from 0 to 3.

In Chemical Formulae 1 to 3,

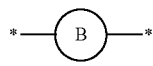

is the same or different in each structural unit, and each is independently represented by Chemical Formula 5, Chemical Formula 6, or Chemical Formula 7:

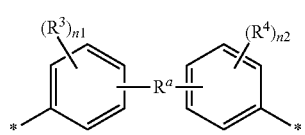

Chemical Formula 5 wherein in Chemical Formula 5, $R^a$ is a substituted or unsubstituted C3 to C30 alicyclic organic group, a substituted or unsubstituted C6 to C30 aromatic organic group, a substituted or unsubstituted C2 to C30 heterocyclic group, or a substituted or unsubstituted C13 to C20 fluorenylene group, $R^3$ and $R^4$ are the same or different and each are independently a halogen, a hydroxyl group, a substituted or unsubstituted C1 to C10 aliphatic organic group, a substituted or unsubstituted C6 to C20 aromatic organic group, an alkoxy group of formula —$OR^{200}$, wherein $R^{200}$ is a C1 to C10 aliphatic organic group, a silyl group of formula —$SiR^{201}R^{202}R^{203}$, wherein $R^{201}$, $R^{202}$, and $R^{203}$ are the same or different and each are independently a hydrogen, or a C1 to C10 aliphatic organic group, and n1 and n2 are the same or different and each are independently an integer ranging from 0 to 4.

Chemical Formula 6

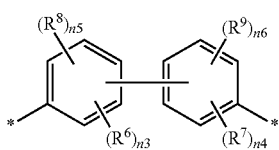

In Chemical Formula 6, $R^6$ and $R^7$ are the same or different and each are independently an electron withdrawing group, $R^8$ and $R^9$ are the same or different, and each are independently a halogen, a hydroxy group, a substituted or unsubstituted C1 to C10 aliphatic organic group, a substituted or unsubstituted C6 to C20 aromatic organic group, an alkoxy group of formula —$OR^{204}$, wherein $R^{204}$ is a C1 to C10 aliphatic organic group, or a silyl group of formula —$SiR^{205}R^{206}R^{207}$, wherein $R^{205}$, $R^{206}$, and $R^{207}$ are the same or different, and each are independently a hydrogen, a C1 to C10 aliphatic organic group, n3 is an integer ranging from 1 to 4, n5 is an integer ranging from 0 to 3, provided that n3+n5 is an integer ranging from 1 to 4, n4 is an integer ranging from 1 to 4, and n6 is an integer ranging from 0 to 3, provided that n4+n6 is an integer ranging from 1 to 4.

Chemical Formula 7

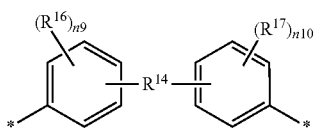

In Chemical Formula 7, $R^{14}$ is O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, C(=O)NH, or a substituted or unsubstituted C6 to C30 aromatic organic group, wherein the aromatic organic group includes one aromatic ring, two or more aromatic rings fused together to provide a condensed ring system, or two or more moieties linked through a single bond or through a functional group selected from a fluorenylene group, O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, and C(=O)NH, $R^{16}$ and $R^{17}$ are the same or different, and each are independently a halogen, a hydroxy group, a substituted or unsubstituted C1 to C10 aliphatic organic group, a substituted or unsubstituted C6 to C20 aromatic organic group, an alkoxy group of formula —$OR^{212}$, wherein $R^{212}$ is a C1 to C10 aliphatic organic group, or a silyl group of formula —$SiR^{213}R^{214}R^{215}$, wherein $R^{213}$, $R^{214}$, and $R^{215}$ are the same or different, and each are independently a hydrogen or a C1 to C10 aliphatic organic group, and n9 and n10 are each independently an integer ranging from 0 to 4.

In Chemical Formula 2, $R^b$ and $R^c$ are the same or different and each are independently a hydrogen, a C1 to C20 alkyl, a C2 to C20 alkenyl, a C2 to C20 alkynyl, a C3 to C20 cycloalkyl, or a C6 to C18 aryl, $R^d$ is a substituted or unsubstituted alkylene, a substituted or unsubstituted alkenylene, a substituted or unsubstituted alkynylene, a substituted or unsubstituted cycloalkylene, a substituted or unsubstituted cycloalkenylene, a substituted or unsubstituted cycloalkenylene, a substituted or unsubstituted arylene, or a substituted or unsubstituted aralkylene, and n is an integer of 1 to 3.

In Chemical Formula 3, $R^1$ is the same or different in each structural unit, and each is independently a substituted or unsubstituted a C6 to C30 aromatic organic group.

The Chemical Formula 4 may be represented by Chemical Formula 8 or Chemical Formula 9.

Chemical Formula 8

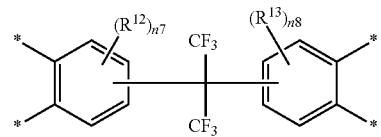

Chemical Formula 9

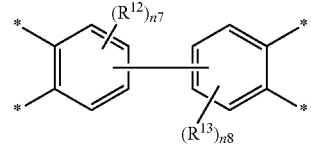

In Chemical Formulae 8 and 9, $R^{12}$, $R^{13}$, $n_7$ and $n_8$ are as defined in Chemical Formula 4.

In Chemical Formula 5, $R^a$ may be selected from chemical formulae.

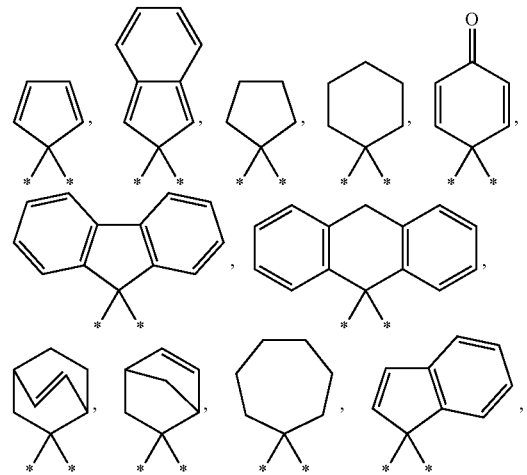

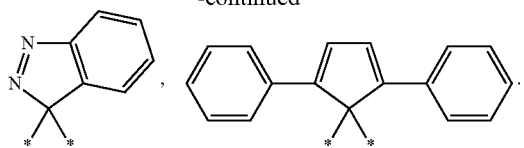

In Chemical Formula 6,
R$^6$ and R$^7$ may be the same or different, and may each be independently selected from —CF$_3$, —CCl$_3$, —CBr$_3$, —Cl$_3$, —NO$_2$, —CN, —COCH$_3$, and —CO$_2$C$_2$H$_5$.

In Chemical Formula 3,
R$^1$ may be the same or different in each structural unit, and may be independently selected from chemical formulae.

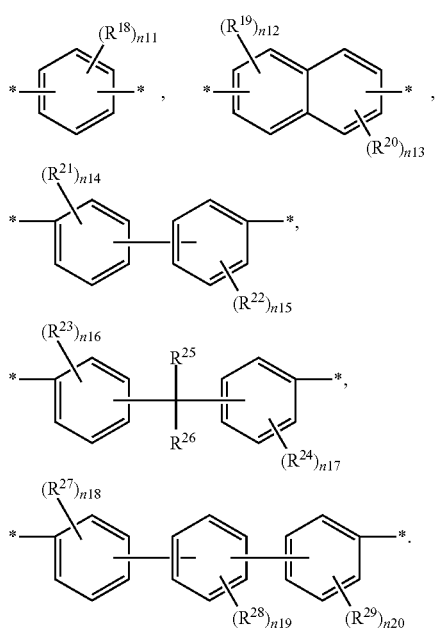

In chemical formulae,
R$^{18}$ to R$^{29}$ are the same or different, and each are independently a halogen, a substituted or unsubstituted C1 to C10 aliphatic organic group, or a substituted or unsubstituted C6 to C20 aromatic organic group, n11 and n14 to n20 are each independently integers ranging from 0 to 4, and n12 and n13 are each independently integers ranging from 0 to 3.

In an embodiment, R$^1$ in Chemical Formula 3 may be the same or different and may be independently selected from chemical formulae.

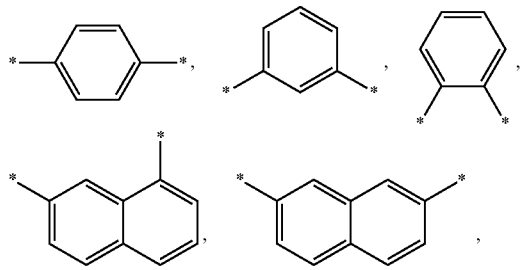

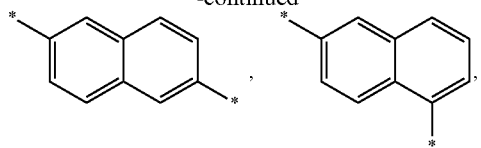

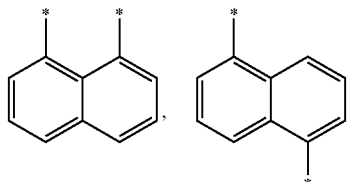

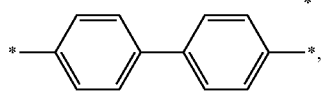

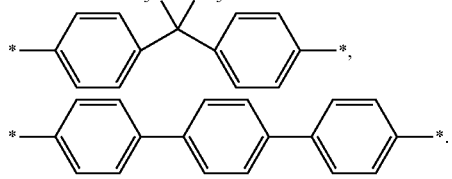

The poly(imide-amide) copolymer according to the embodiment may include the structural units represented by Chemical Formula 1 or Chemical Formula 2, and the structural unit represented by Chemical Formula 3 in a mole ratio of about 5 to about 55:about 95 to about 45.

Further, the structural unit represented by Chemical Formula 1 and the structural unit represented by Chemical Formula 2 may be included in a mole ratio of about 99 to about 1:about 1 to about 99.

According to another embodiment, provided is a composition including a poly(imide-amide) copolymer including a structural unit represented by Chemical Formula 1, a structural unit represented by Chemical Formula 2, and a structural unit represented by Chemical Formula 3, and an inorganic particle or a precursor thereof.

The inorganic particles or a precursor thereof of the composition may be an oxide or a hydroxide of at least one element selected from Ti, Si, Al, Zr, Sn, B, and Ce, or a precursor of the oxide or hydroxide.

In an embodiment, the inorganic particles may be silica or titania.

A precursor of the titania may include titanium tetraisopropoxide.

A precursor of the silica may include tetraethyl orthosilicate, tetramethyl orthosilicate, or a compound represented by Chemical Formulae 10 to 12.

Chemical Formula 10

In Chemical Formula 10,
R$^b$ and R$^c$ are as defined in Chemical Formula 2, and n is an integer of 1 to 3.

Chemical Formula 11

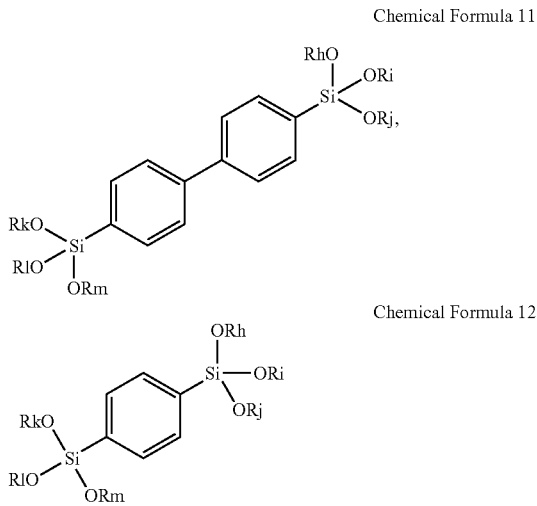

Chemical Formula 12

In Chemical Formulae 11 and 12, $R_h$ to $R_m$, are the same or different, and are each independently a C1 to C20 alkyl, a C2 to C20 alkenyl, a C2 to C20 alkynyl, a C3 to C20 cycloalkyl, or a C6 to C18 aryl.

An amount of the inorganic particles or a precursor thereof in the composition may be about 1 weight % to about 60 weight % based on the amount of the copolymer.

According to yet another embodiment, provided is an article prepared by curing a composition including a poly(imide-amide) copolymer including a structural unit represented by Chemical Formula 1, a structural unit represented by Chemical Formula 2, and a structural unit represented by Chemical Formula 3, and an inorganic particle or a precursor thereof.

The article may include a cross-linked poly(imide-amide) copolymer represented by Chemical Formula 13:

Chemical Formula 13

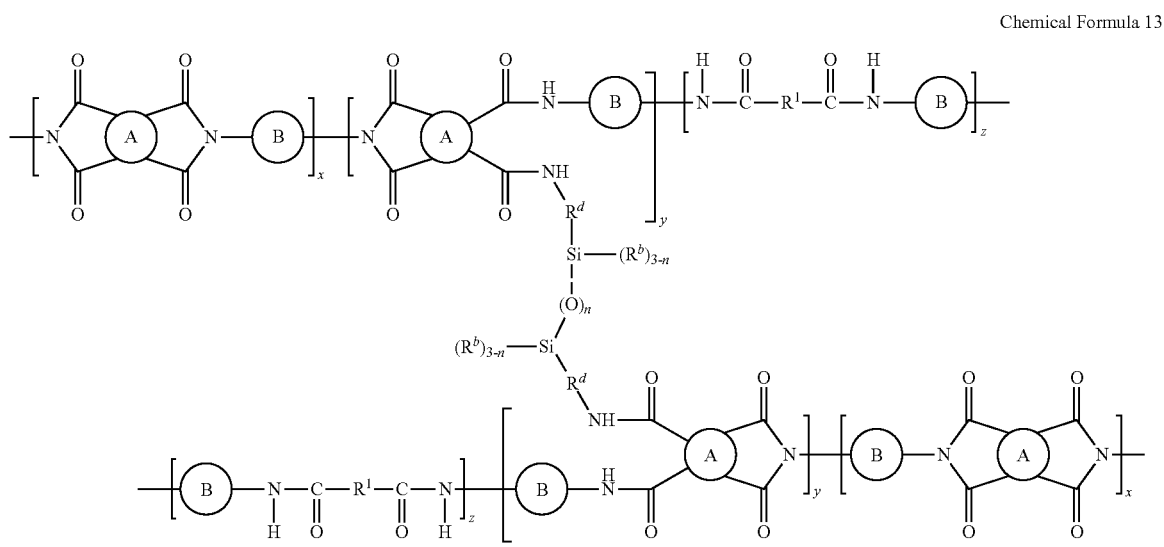

wherein in Chemical Formula 13,
each substituent and group of the poly(imide-amide) copolymer is as defined in Chemical Formulae 1 to 3.
In Chemical Formula 13,
x, y, and z are mole fractions of respective structural units, wherein the mole ratio of (x+y):z may be about 5 to about 55:about 95 to about 45.

The article may also include a cross-linked poly(imide-amide) copolymer represented by Chemical Formula 14:

Chemical Formula 14

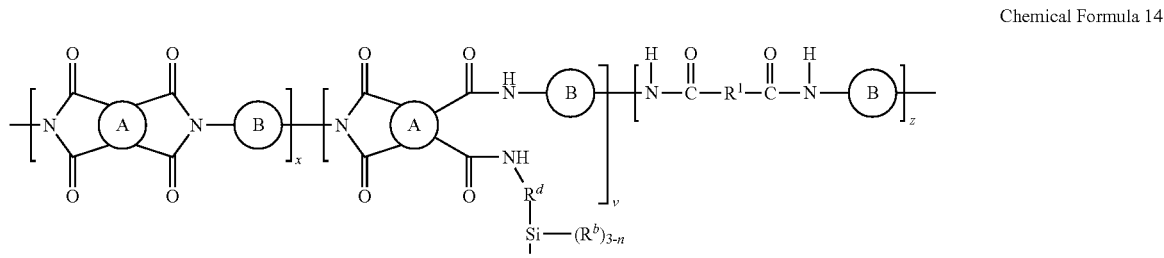

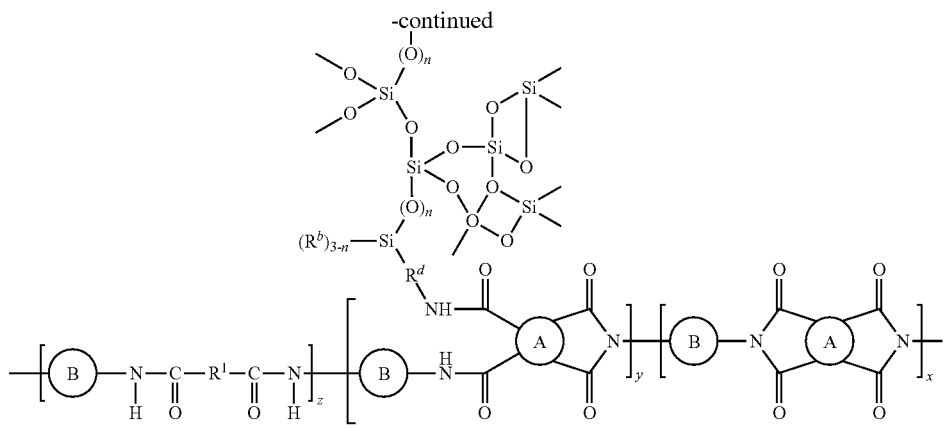

wherein in Chemical Formula 14, each substituent and group of the poly(imide-amide) copolymer is as defined in Chemical Formulae 1 to 3.

In Chemical Formula 14, x, y, and z are mole fractions of respective structural units, wherein the mole ratio of (x+y):z is about 5 to about 55:about 95 to about 45.

The article may be a film, a fiber, a coating material, or an adhesive.

According to another embodiment, provided is a method of preparing an article including the cross-linked poly(imide-amide) copolymer represented by the Chemical Formula 13 or Chemical Formula 14.

The method may include:

preparing a poly(imide-amide) copolymer including a structural unit represented by Chemical Formula 1 and a structural unit represented by Chemical Formula 3, adding a silane compound represented by Chemical Formula 15 to poly(imide-amide) copolymer, thereby introducing the silane compound to a side chain of a structural unit represented by the Chemical Formula 1 to form a structural unit represented by Chemical Formula 2, and thereby obtaining a poly(imide-amide) copolymer including a structural unit represented by Chemical Formula 1, a structural unit represented by Chemical Formula 2, and a structural unit represented by Chemical Formula 3, introducing inorganic particles or a precursor thereof to the poly(imide-amide) copolymer including a structural unit represented by Chemical Formula 1, a structural unit represented by Chemical Formula 2, and a structural unit represented by Chemical Formula 3 to produce a poly(imide-amide) nano composite composition, and curing the poly(imide-amide) nano composite composition to provide the article.

Chemical Formula 15

In Chemical Formula 15, $R^b$, $R^c$, and $R^d$ are as defined in Chemical Formula 2, and n may be an integer of 1 to 3.

The article may be a film, and the curing the poly(imide-amide) nanocomposite composition may include:

coating poly(imide-amide) nanocomposite composition on a substrate to produce a belt film.

The belt film may further be separated from the substrate, and the separated belt film may be heat treated to produce a cured film roll.

According to yet another embodiment, provided is a display device including the article.

Hereinafter, further embodiments will be described in detail.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
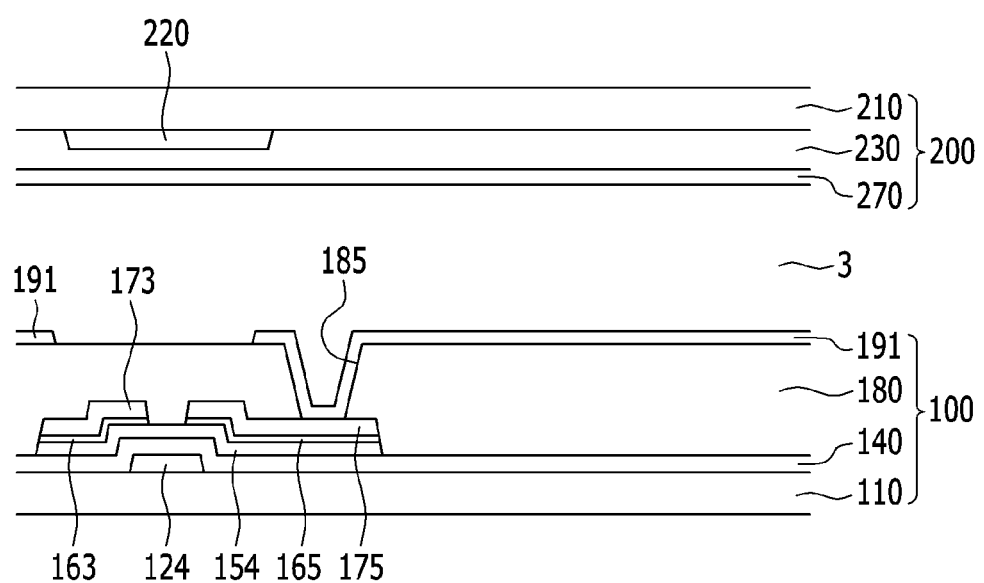
FIG. 1 is a cross-sectional view of a liquid crystal display ("LCD") in accordance with an embodiment.

This disclosure will be described more fully hereinafter with reference to the accompanying drawings, in which embodiments are shown. This disclosure may, however, be embodied in many different forms and is not to be construed as limited to the exemplary embodiments set forth herein.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Mixture" as used herein is inclusive of all types of combinations, including blends, alloys, solutions, and the like.

As used herein, when a specific definition is not otherwise provided, the term "substituted" refers to a group or compound substituted with at least one substituent including a halogen (F, Br, Cl, or I), a hydroxyl group, a nitro group, a cyano group, an amino group ($NH_2$, $NH(R^{100})$ or $N(R^{101})$ ($R^{102}$), wherein $R^{100}$, $R^{101}$, and $R^{102}$ are the same or different, and are each independently a C1 to C10 alkyl group, an amidino group, a hydrazine group, a hydrazone group, a carboxyl group, an ester group, a ketone group, a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group, in place of at least one hydrogen of a functional group, or the substituents may be linked to each other to provide a ring.

As used herein, the term "alkyl group" refers to a straight or branched chain saturated aliphatic hydrocarbon group having the specified number of carbon atoms and having a valence of at least one. Non-limiting examples of the alkyl group are methyl, ethyl, and propyl.

As used herein, the term "alkenyl group" refers to a straight or branched chain aliphatic hydrocarbon group including at least one double bond, and having the specified number of carbon atoms. Non-limiting examples of the alkenyl group are ethenyl and propenyl.

As used herein, the term "alkynyl group" refers to a straight or branched chain aliphatic hydrocarbon group including at least one triple bond, and having the specified number of carbon atoms. Non-limiting examples of the alkynyl group are ethynyl and propynyl.

As used herein, the term "cycloalkyl group" refers to a monovalent group having one or more saturated rings in which all ring members are carbon and having a specified number of carbon atoms. Non-limiting examples of the cycloalkyl group are cyclopentyl and cyclohexyl.

As used herein, the term "cycloalkenyl group" refers to a monovalent group having one or more rings in which all ring members are carbon, including at least one double bond, and having a specified number of carbon atoms. Non-limiting examples of the cycloalkyl group are cyclopentenyl and cyclohexenyl.

As used herein, the term "cycloalkynyl group" refers to a monovalent group having one or more rings in which all ring members are carbon including at least one triple bond, and having a specified number of carbon atoms. Non-limiting examples of the cycloalkyl group are cyclooctynyl and cyclononynyl.

As used herein, the term "aryl group" refers to an aromatic hydrocarbon containing at least one ring. Non-limiting examples of the aryl group are phenyl, naphthyl, and tetrahydronaphthyl.

As used herein, the term "aralkyl" means a substituted or unsubstituted aryl group covalently linked to an alkyl group that is linked to a compound and having a specified number of carbon atoms. Non-limiting examples of the aralkyl group are benzyl and 2-phenethyl.

As used herein, the terms "alkylene group", "alkenylene group", "alkynelene group", "cycloalkylene group", "cycloalkenylene group", "cycloalkynelene group", "arylene" group", and "aralkylene group" refer to a divalent group respectively derived from an alkyl group, a cycloalkyl group, a heterocycloalkyl group, an aryl group, and a heteroaryl group as defined above.

As used herein, when a definition is not otherwise provide, "electron-withdrawing group" refers to an atom or group that withdraws electron density from a conjugated π system via an inductive or resonance electron effect, thus making the π system more electrophilic.

As used herein, when a specific definition is not otherwise provided, the term "alkyl group" refers to a C1 to C30 alkyl group, for example a C1 to C15 alkyl group, the term "cycloalkyl group" refers to a C3 to C30 cycloalkyl group, for example a C3 to C18 cycloalkyl group, the term "alkoxy group" refer to a C1 to C30 alkoxy group, for example a C1 to C18 alkoxy group, the term "ester group" refers to a C2 to C30 ester group, for example a C2 to C18 ester group, the term "ketone group" refers to a C2 to C30 ketone group, for example a C2 to C18 ketone group, the term "aryl group" refers to a C6 to C30 aryl group, for example a C6 to C18 aryl group, the term "alkenyl group" refers to a C2 to C30 alkenyl group, for example a C2 to C18 alkenyl group, the term "alkynyl group" refers to a C2 to C30 alkynyl group, for example a C2 to C18 alkynyl group, the term "alkylene group" refers to a C1 to C30 alkylene group, for example a C1 to C18 alkylene group, and the term "arylene group" refers to a C6 to C30 arylene group, for example a C6 to C16 arylene group.

As used herein, when a specific definition is not otherwise provided, the term "aliphatic" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, for example a C1 to C15 alkyl group, a C2 to C15 alkenyl group, a C2 to C15 alkynyl group, a C1 to C15 alkylene group, a C2 to C15 alkenylene group, or a C2 to C15 alkynylene group, the term "alicyclic organic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or a C3 to C30 cycloalkynylene group, for example a C3 to C15 cycloalkyl group, a C3 to C15 cycloalkenyl group, a C3 to C15 cycloalkynyl group, a C3 to C15 cycloalkylene group, a C3 to C15 cycloalkenylene group, or a C3 to C15 cycloalkynylene group.

As used herein when a definition is not otherwise provided, the term "aromatic organic group" refers to a C6 to C30 group including one aromatic ring, two or more aromatic rings fused together to provide a condensed ring system, or two or more moieties independently selected from the foregoing (a single aromatic ring or a condensed ring system) linked through a single bond or through a functional group selected from a fluorenylene group, O, S, C(=O), CH(OH), S(=O)$_2$, Si(CH$_3$)$_2$, (CH$_2$)$_p$ wherein 1≤p≤10, (CF$_2$)$_q$ wherein 1≤q≤10, C(CH$_3$)$_2$, C(CF$_3$)$_2$, and C(=O)NH, for example through S(=O)$_2$, for example an aryl group or a C6 to C30 arylene group, for example a C6 to C16 aryl group or a C6 to C16 arylene group such as phenylene.

As used herein, when a specific definition is not otherwise provided, the term "heterocyclic group" refers to a C2 to C30 cycloalkyl group, a C2 to C30 cycloalkylene group, a C2 to C30 cycloalkenyl group, a C2 to C30 cycloalkenylene group, a C2 to C30 cycloalkynyl group, a C2 to C30 cycloalkynylene group, a C2 to C30 heteroaryl group, or a C2 to C30 heteroarylene group including 1 to 3 heteroatoms selected from O, S, N, P, Si, and a combination thereof in one ring, for example a C2 to C15 cycloalkyl group, a C2 to C15 cycloalkylene group, a C2 to C15 cycloalkenyl group, a C2 to C15 cycloalkenylene group, a C2 to C15 cycloalkynyl group, a C2 to C15 cycloalkynylene group, a C2 to C15 heteroaryl group, or a C2 to C15 heteroarylene group including 1 to 3 heteroatoms selected from O, S, N, P, Si, and a combination thereof in one ring.

As used herein, when a definition is not otherwise provided, "combination" commonly refers to mixing or copolymerization.

In addition, in the specification, the mark "*" may refer to a point of attachment to another atom.

Poly(imide-aramide) copolymer film has excellent thermal and mechanical properties, as well as good processability, unlike a polyimide film. Although polyimide has excellent thermal stability, it hardly dissolves in solvents, and thus the polyamic acid is used for coating. However, the polyamic acid is very unstable in a solution state due to the reversible reaction, and its processibility is poor.

Aramid has excellent optical properties, as well as good processibility, as it readily dissolves in a solvent, but its thermal stability is rather low compared with polyimides.

Combining desired properties of polyimide and aramide, a transparent poly(imide-aramide), which has good optical and thermal properties, as well as good processibility, has been synthesized. Although the poly(imide-aramide) has good processibility, the film prepared from the poly(imide-aramide) is easily damaged by organic solvents. That is, the chemical resistance of the poly(imide-aramide) is not sufficient.

Transparent poly(imide-amide) material is useful as a display substrate material due to its good transparency, thermal stability, high mechanical properties, flexibility, etc. However, excellent chemical resistance of the material for a display substrate is also desired during the washing, etching, and other processing steps.

According to an embodiment, provided is a novel poly(imide-amide) copolymer having suitable optical properties and thermal stability, as well as good processibility, by introducing inorganic precursors into poly(imide-amide) copolymer to form a cross-linking structure between them. The poly(imide-amide) copolymer according to the embodiment includes a structural unit represented by following Chemical Formula 1, a structural unit represented by following Chemical Formula 2, and a structural unit represented by following Chemical Formula 3:

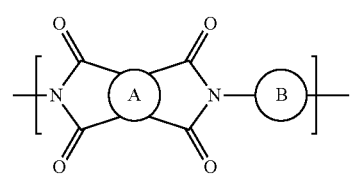

Chemical Formula 1

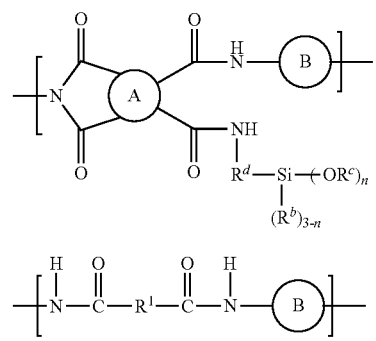

Chemical Formula 2

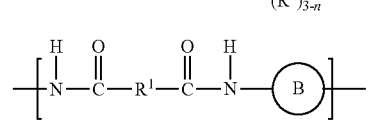

Chemical Formula 3

In Chemical Formulae 1 to 3,

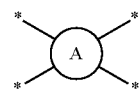

is the same or different in each structural unit, and each is independently represented by following Chemical Formula 4:

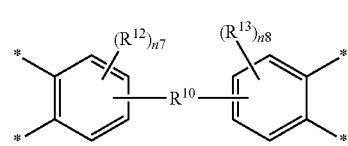

Chemical Formula 4 wherein in Chemical Formula 4, $R^{10}$ is a single bond, a substituted or unsubstituted C1 to C30 aliphatic organic group, a substituted or unsubstituted C3 to C30 alicyclic organic group, a substituted or unsubstituted C6 to C30 aromatic organic group, or a substituted or unsubstituted C2 to C30 heterocyclic group, $R^{12}$ and $R^{13}$ are the same or different and each are independently a halogen, a hydroxyl group, a substituted or unsubstituted C1 to C10 aliphatic organic group, a substituted or unsubstituted C6 to C20 aromatic organic group, an alkoxy group of formula $-OR^{205}$, wherein $R^{205}$ is a C1 to C10 aliphatic organic group, a silyl group of formula $-SiR^{209}R^{210}R^{211}$, wherein $R^{209}$, $R^{210}$, and $R^{211}$ are the same or different and each are independently a hydrogen, or a C1 to C10 aliphatic organic group, and n7 and n8 are the same or different and each are independently an integer ranging from 0 to 3.

In Chemical Formulae 1 to 3,

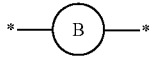

is the same or different in each structural unit, and each is independently represented by following Chemical Formula 5, Chemical Formula 6, or Chemical Formula 7:

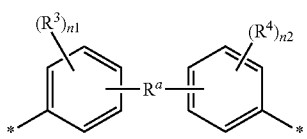

Chemical Formula 5 wherein in Chemical Formula 5, $R^a$ is a substituted or unsubstituted C3 to C30 alicyclic organic group, a substituted or unsubstituted C6 to C30 aromatic organic group, a substituted or unsubstituted C2 to C30 heterocyclic group, or a substituted or unsubstituted C13 to C20 fluorenylene group, $R^3$ and $R^4$ are the same or different and each are independently a halogen, a hydroxyl group, a substituted or unsubstituted C1 to C10 aliphatic organic group, a substituted or unsubstituted C6 to C20 aromatic organic group, an alkoxy group of formula $-OR^{200}$, wherein $R^{200}$ is a C1 to C10 aliphatic organic group, a silyl group of formula $-SiR^{201}R^{202}R^{203}$, wherein $R^{201}$, $R^{202}$, and $R^{203}$ are the same or different and each are independently a hydrogen, or a C1 to C10 aliphatic organic group, and n1 and n2 are the same or different and each are independently an integer ranging from 0 to 4.

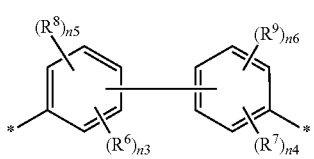

Chemical Formula 6

In Chemical Formula 6, $R^6$ and $R^7$ are the same or different and each are independently an electron withdrawing group, $R^8$ and $R^9$ are the same or different, and each are independently a halogen, a hydroxy group, a substituted or unsubstituted C1 to C10 aliphatic organic group, a substituted or unsubstituted C6 to C20 aromatic organic group, an alkoxy group of formula $-OR^{204}$, wherein $R^{204}$ is a C1 to C10 aliphatic organic group, or a silyl group of formula $-SiR^{205}R^{206}R^{207}$, wherein $R^{205}$, $R^{206}$, and $R^{207}$ are the same or different, and each are independently a hydrogen, a C1 to C10 aliphatic organic group, n3 is an integer ranging from 1 to 4, n5 is an integer ranging from 0 to 3, provided that n3+n5 is an integer ranging from 1 to 4, n4 is an integer ranging from 1 to 4, n6 is an integer ranging from 0 to 3, provided that n4+n6 is an integer ranging from 1 to 4.

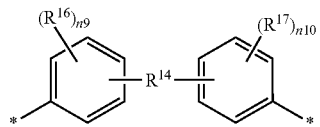

Chemical Formula 7

In Chemical Formula 7, $R^{14}$ is O, S, C(=O), CH(OH), S(=O)$_2$, Si(CH$_3$)$_2$, (CH$_2$)$_p$ wherein $1 \leq p \leq 10$, (CF$_2$)$_q$ wherein $1 \leq q \leq 10$, C(CH$_3$)$_2$, C(CF$_3$)$_2$, C(=O)NH, or a substituted or unsubstituted C6 to C30 aromatic organic group, wherein the aromatic organic group includes one aromatic ring, two or more aromatic rings fused together to provide a condensed ring system, or two or more moieties linked through a single bond or through a functional group selected from a fluorenylene group, O, S, C(=O), CH(OH), S(=O)$_2$, Si(CH$_3$)$_2$, (CH$_2$)$_p$ wherein $1 \leq p \leq 10$, (CF$_2$)$_q$ wherein $1 \leq q \leq 10$, C(CH$_3$)$_2$, C(CF$_3$)$_2$, and C(=O)NH, $R^{16}$ and $R^{17}$ are the same or different, and each are independently a halogen, a hydroxy group, a substituted or unsubstituted C1 to C10 aliphatic organic group, a substituted or unsubstituted C6 to C20 aromatic organic group, an alkoxy group of formula $-OR^{212}$, wherein $R^{212}$ is a C1 to C10 aliphatic organic group, or a silyl group of formula $-SiR^{213}R^{214}R^{215}$, wherein $R^{213}$, $R^{214}$, and $R^{215}$ are the same or different, and each are independently a hydrogen or a C1 to C10 aliphatic organic group, and n9 and n10 are each independently an integer ranging from 0 to 4.

In Chemical Formula 2, $R^b$ and $R^c$ are the same or different and each are independently a hydrogen, a C1 to C20 alkyl, a C2 to C20 alkenyl, a C2 to C20 alkynyl, a C3 to C20 cycloalkyl, or a C6 to C18 aryl, $R^d$ is a substituted or unsubstituted alkylene, a substituted or unsubstituted alkenylene, a substituted or unsubstituted alkynylene, a substituted or unsubstituted cycloalkylene, a substituted or unsubstituted cycloalkenylene, a substituted or unsubstituted cycloalkynylene, a substituted or unsubstituted arylene, or a substituted or unsubstituted aralkylene, and n is an integer of 1 to 3.

In Chemical Formula 3, $R^1$ is the same or different in each structural unit, and each is independently a substituted or unsubstituted a C6 to C30 aromatic organic group.

The Chemical Formula 4 may be represented by the following Chemical Formula 8 or Chemical Formula 9.

Chemical Formula 8

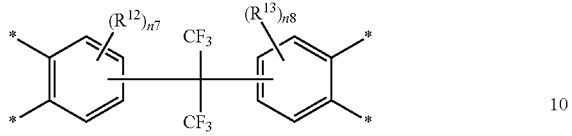

Chemical Formula 9

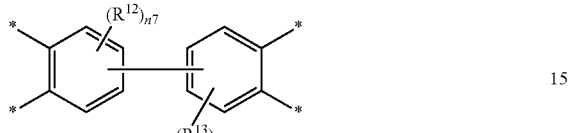

In Chemical Formulae 8 and 9, $R^{12}$, $R^{13}$, $n_7$ and $n_8$ are as defined in Chemical Formula 4.

In Chemical Formula 5, $R^a$ may be selected from the following chemical formulae.

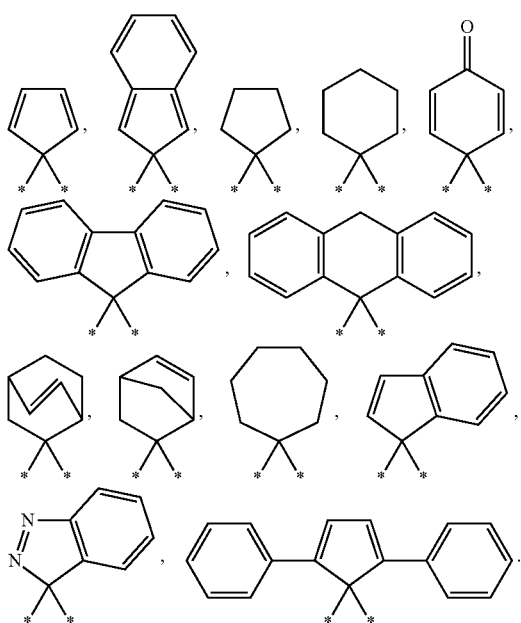

In Chemical Formula 6, $R^6$ and $R^7$ may be the same or different, and may be independently selected from —$CF_3$, —$CCl_3$, —$CBr_3$, —$Cl_3$, —$NO_2$, —CN, —$COCH_3$, and —$CO_2C_2H_5$.

In Chemical Formula 3, $R^1$ may be the same or different in each structural unit, and may be independently selected from the following chemical formulae.

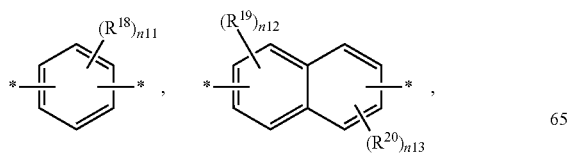

-continued

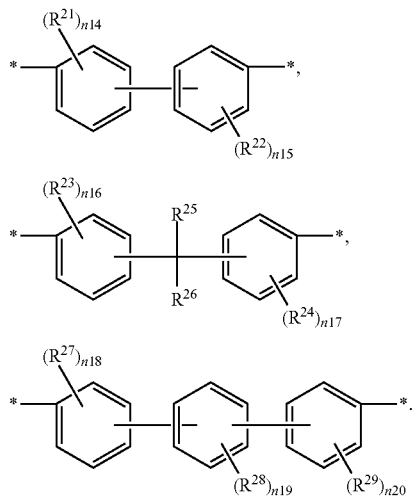

In the above chemical formulae, $R^{18}$ to $R^{29}$ are the same or different, and are each independently a halogen, a substituted or unsubstituted C1 to C10 aliphatic organic group, or a substituted or unsubstituted C6 to C20 aromatic organic group, n11 and n14 to n20 are each independently integers ranging from 0 to 4, and n12 and n13 are each independently integers ranging from 0 to 3.

In an embodiment, the $R^1$ may be the same or different and may be independently selected from the following chemical formulae.

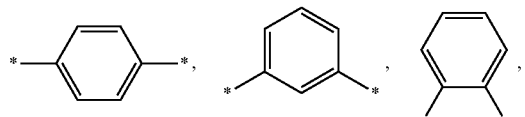

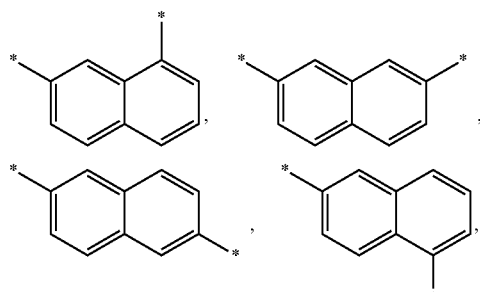

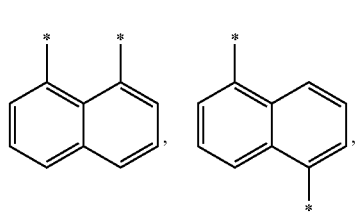

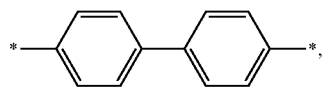

-continued

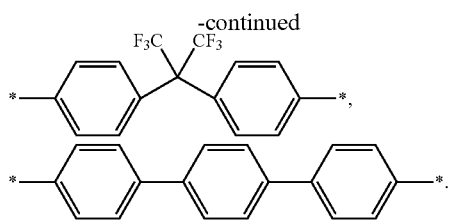

In the poly(imide-amide) copolymer according to the embodiment the structural units represented by Chemical Formula 1 or Chemical Formula 2 and the structural unit represented by Chemical Formula 3 may be present in a mole ratio of about 5 to about 55:about 95 to about 45.

Further, the structural unit represented by Chemical Formula 1 and the structural unit represented by Chemical Formula 2 may be included in a mole ratio of about 99 to about 1:about 1 to about 99.

Figure 3:
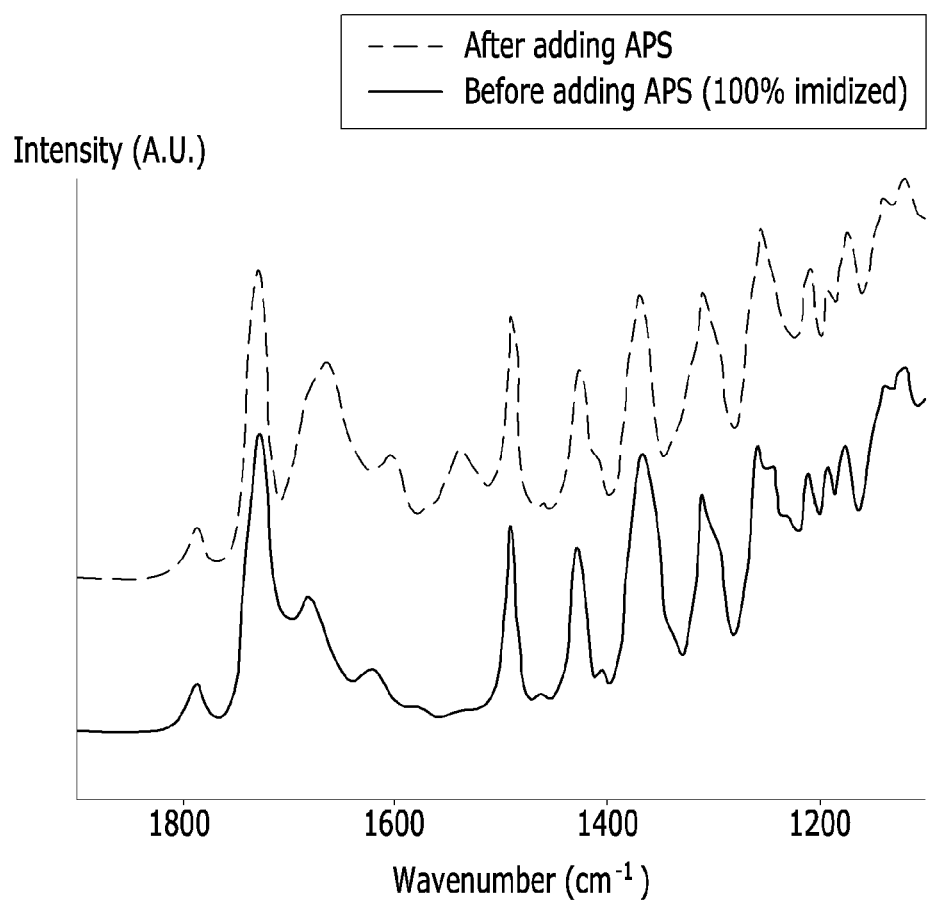
FIG. 3 is an FT-IR graph of intensity (arbitrary unit, a. u.) versus wavenumber (reverse centimeters, $cm^{-1}$) showing the presence of a silane compound having an amino terminal in a poly(imide-aide) copolymer, in which the amino terminal of the silane compound being introduced to a side chain of the poly(imide-amide copolymer.

As depicted in Chemical Formula 2, the poly(imide-amide) copolymer is formed when imide units and amide units in the poly(imide-amide) copolymer are decyclized (undergo ring opening), an amide bond between the carbonyl group of the decyclized imide ring and an amino terminal of a silane compound is formed, and thus a silane compound having an amino terminal is introduced at a side chain of the poly(imide-amide) copolymer. This is confirmed by an experiment described below in the Examples. That is, in order to conduct the preparation of the copolymer, 6-FDA (2,2-bis-(3,4-dicarboxyphenyl)hexafluoropropane dianhydride) and TFDB (2,2'-bis(trifluoromethyl)benzidine) are reacted to provide a polyimide, and 3-aminopropyl triethoxy silane (APS) is added thereto to react with the polyimide. It is then confirmed that an amino group of the APS is bonded to the carbonyl group derived from an opened imide ring. FIG. 3 is the FT-IR spectroscopy of the product of the above reaction. FIG. 3 shows two peaks that are not seen on the FT-IR graph of the polyimide before adding APS. In FIG. 3, the peak at 1536 $cm^{-1}$ indicates the presence of the N—H bond in the amide group, and the peak at 1684 $cm^{-1}$ indicates the presence of the C=O bond in the amide group. From the spectroscopy, it is confirmed that an imide ring in the polyimide is decyclized to form an amide bond between an amino group of a silane compound (APS) and a carbonyl group of the decyclized imide ring, so the silane compound can be introduced to a side chain of a poly(imide-amide) copolymer.

Meanwhile, the poly(imide-amide) copolymer, to a side chain of which a silane compound is introduced, may be cross-linked to another poly(imide-amide) copolymer, to a side chain of which also a silane compound is introduced. The poly(imide-amide) copolymer being cross-linked to each other may be represented, for example, by following Chemical Formula 13:

Chemical Formula 13

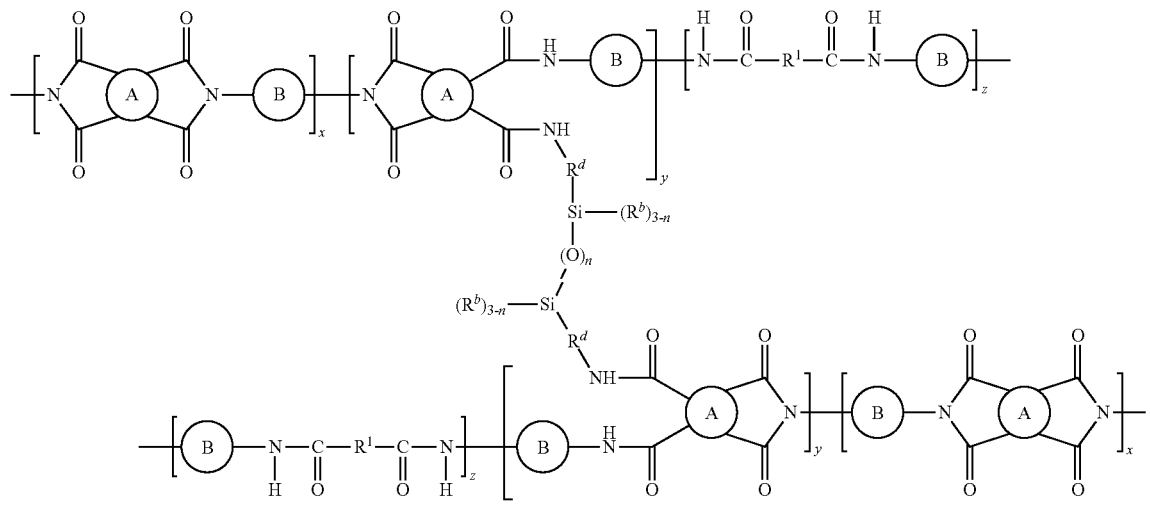

In Chemical Formula 13, the definitions of each group, moiety, and substituent are identical to those in Chemical Formulae 1 to 3.

In Chemical Formula 13, each of x, y, and z indicates the mole number of the respective structural unit, and (x+y):z may be about 5 to about 55:about 95 to about 45.

As depicted in Chemical Formula 13, the poly(imide-amide) copolymer according to the embodiment and an article including the copolymer may have greatly improved chemical resistance to the solvents, etc., compared to the poly(imide-amide) copolymer that does not form such cross-linking therebetween, due to a silane fragment introduced into a side chain of a part of an imide unit to form a cross-linking to another silane compound introduced into another poly(imide-amide).

Meanwhile, the poly(imide-amide) may form a more intimate cross-linking structure as additional inorganic particles or inorganic particle precursors are introduced to the copolymer, since the additional inorganic particles or inorganic particle precursors may crosslink to the silane compound introduced to the copolymer.

The additional inorganic particles or precursors thereof may be an oxide or hydroxide of at least one element selected from titanium (Ti), strontium (Si), aluminum (Al), zirconium (Zr), tin (Sn), boron (B), and cerium (Ce), or a precursor of the oxide or hydroxide. For example, the additional inorganic particles may be silica ($SiO_2$) or titania ($TiO_2$).

When $TiO_2$ is used as an inorganic particle, titanium tetraisopropoxide may be used as a precursor of the $TiO_2$.

When $SiO_2$ is used as an inorganic particle, tetraethyl orthosilicate (TEOS), tetramethyl orthosilicate (TMOS), or a compound represented by following chemical formulae 10 to 12 may be used as a precursor of the silica.

Chemical Formula 10

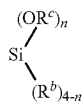

In Chemical Formula 10, $R^b$ and $R^c$ are as defined in Chemical Formula 2, and n is an integer of 1 to 3.

Chemical Formula 11

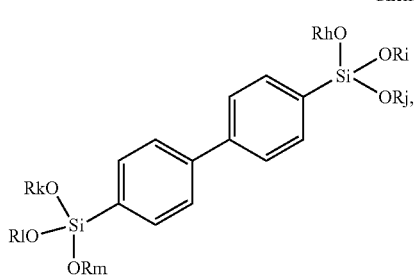

Chemical Formula 12

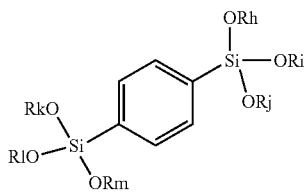

In the above Chemical Formulae 11 and 12, $R_h$ to $R_m$ are the same or different, and are each independently a C1 to C20 alkyl, a C2 to C20 alkenyl, a C2 to C20 alkynyl, a C3 to C20 cycloalkyl, or a C6 to C18 aryl.

The inorganic particles or a precursor thereof may be included in an amount of about 1 percent by weight (weight %) to about 60 weight %, and, for example, in an amount of about 5 weight % to about 20 weight %, based on the amount of the copolymer.

The poly(imide-amide) copolymer including the additional inorganic particles in the above range has also excellent optical properties, thermal stability, mechanical strength, and flexibility, as well as high chemical resistance.

Therefore, according to yet another embodiment, provided is an article including the copolymer represented by the above Chemical Formula 13, or the copolymer further including the additional inorganic particles.

The article may include a copolymer represented by the above Chemical Formula 13, or a copolymer represented by following Chemical Formula 14:

Chemical Formula 14

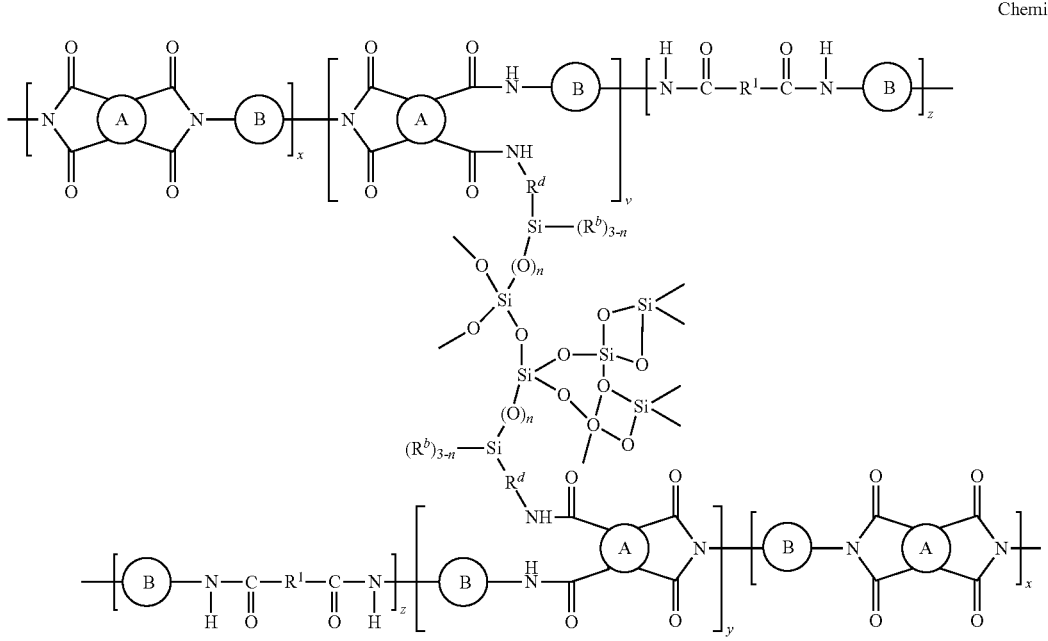

wherein in Chemical Formula 14,
each substituent and group of the poly(imide-amide) copolymer is as defined in Chemical Formulae 1 to 3.

In Chemical Formula 14,
each of x, y, and z indicates the mole fractions of the respective structural units,
wherein the mole ratio of (x+y):z may be about 5 to about 55:about 95 to about 45.

The article may be a film, a fiber, a coating material, or an adhesive.

The article may be used as a material of a display substrate, as it has improved chemical resistance to solvents, which is desired to carry out washing or etching process during the preparation of the display substrate.

According to another embodiment, provided is a method of preparing an article including the cross-linked poly(imide-amide) copolymer represented by the Chemical Formula 13 or Chemical Formula 14.

The method may include:
preparing a poly(imide-amide) copolymer including a structural unit represented by Chemical Formula 1 and a structural unit represented by Chemical Formula 3,
adding a silane compound represented by following Chemical Formula 15 to the above poly(imide-amide) copolymer, thereby introducing the silane compound to a side chain of a structural unit represented by the Chemical Formula 1 to form a structural unit represented by the above Chemical Formula 2, and thereby obtaining a poly(imide-amide) copolymer including a structural unit represented by Chemical Formula 1, a structural unit represented by Chemical Formula 2, and a structural unit represented by Chemical Formula 3,
introducing inorganic particles or a precursor thereof to the obtained poly(imide-amide) copolymer including a structural unit represented by Chemical Formula 1, a structural unit represented by Chemical Formula 2, and a structural unit represented by Chemical Formula 3 to produce a composition of poly(imide-amide) nano composite, and
curing the composition of the poly(imide-amide) nano composite to provide the article:

Chemical Formula 15

In Chemical Formula 15,
$R^b$, $R^c$, and $R^d$ are as defined in Chemical Formula 2, and n may be an integer of 1 to 3.

The article may be a film, and the curing the poly(imide-amide) nanocomposite composition may include
coating the above poly(imide-amide) nano composite composition on a substrate to produce a belt film, and
curing the belt film.

The belt film may be separated from the substrate, and the separated belt film may be cured by heating to produce a cured film roll.

As described above, the poly(imide-amide) copolymer with improved chemical resistance according to the embodiment or an article including the same may be advantageously used in a display device which requires washing by solvent or etching, and thus according to yet another embodiment, provided is a display device including the article.

Another embodiment provides a display device including the article. The display device may include a liquid crystal display (LCD), an organic light emitting diode (OLED), and the like, but is not limited thereto.

Among the display devices, a liquid crystal display (LCD) is described by referring to FIG. 1. FIG. 1 is a cross-sectional view of a liquid crystal display (LCD) in accordance with an embodiment.

Referring to FIG. 1, the liquid crystal display (LCD) includes a thin film transistor array panel 100, a common electrode panel 200 facing the thin film transistor array panel 100, and a liquid crystal layer 3 interposed between the two panels 100 and 200.

First, the thin film transistor array panel 100 will be described.

A gate electrode 124, a gate insulating layer 140, a semiconductor 154, a plurality of ohmic contacts 163 and 165, a source electrode 173 and a drain electrode 175 are sequentially disposed on a substrate 110. The source electrode 173 and the drain electrode 175 are isolated from each other and face each other with the gate electrode 124 disposed between them.

One gate electrode 124, one source electrode 173, and one drain electrode 175 constitute one thin film transistor (TFT) together with the semiconductor 154, and a channel of the thin film transistor is formed in the semiconductor 154 between the source electrode 173 and the drain electrode 175.

A protective layer 180 is disposed on the gate insulating layer 140, the source electrode 173, and the drain electrode 175, and a contact hole 185 that exposes the drain electrode 175 is formed in the protective layer 180.

A pixel electrode 191 formed of a transparent conductive material such as ITO or IZO is disposed on the protective layer 180. The pixel electrode 191 is connected to the drain electrode 175 through the contact hole 185.

The common electrode panel 200 will now be described in detail.

In the common electrode panel 200, a lighting member 220 referred to as a black matrix is disposed on a substrate 210, a color filter 230 is disposed on the substrate 210 and the lighting member 220, and a common electrode 270 is formed on the color filter 230.

Herein, the substrates 110 and 210 may be articles including the composite including the poly(amide-imide) copolymer and inorganic particles.

Figure 2:
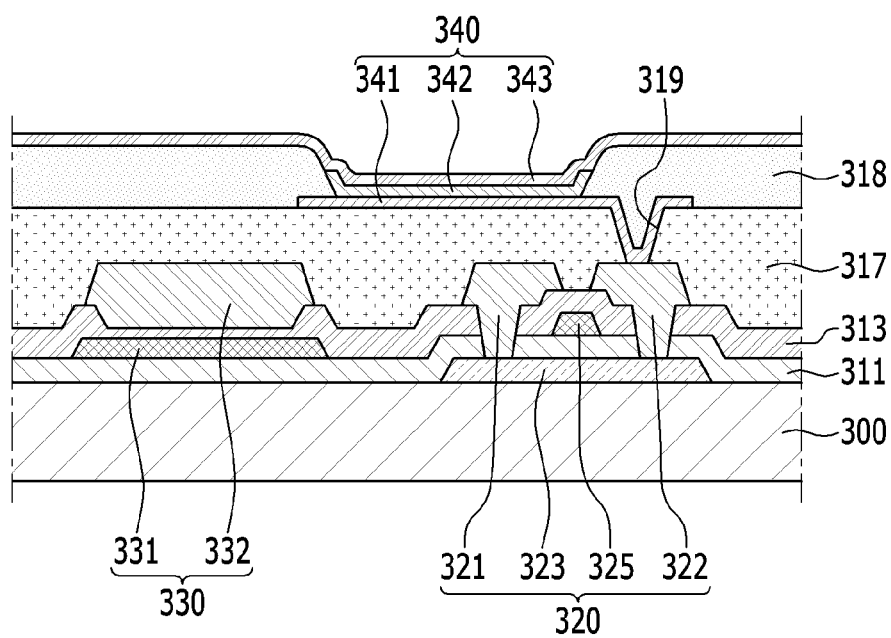
FIG. 2 is a cross-sectional view of an organic light emitting diode ("OLED") in accordance with an embodiment.

Among the display devices, an organic light emitting diode (OLED) is described by referring to FIG. 2. FIG. 2 is a cross-sectional view of an organic light emitting diode (OLED) in accordance with an embodiment.

Referring to FIG. 2, a thin film transistor 320, a capacitor 330, and an organic light emitting element 340 are formed on a substrate 300. The thin film transistor 320 includes a source electrode 321, a semiconductor layer 323, a gate electrode 325, and a drain electrode 322, and the capacitor 330 includes a first capacitor 331 and a second capacitor 332. The organic light emitting element 340 includes a pixel electrode 341, an intermediate layer 342, and an opposed electrode 343.

According to an embodiment, the semiconductor layer 323, a gate insulating layer 311, the first capacitor 331, the gate electrode 325, an interlayer insulating layer 313, the second capacitor 332, the source electrode 321, and the drain electrode 322 are formed on the substrate 300. The source electrode 321 and the drain electrode 322 are isolated from each other, and face each other with the gate electrode 325 disposed between them.

A planarization layer 317 is disposed on the interlayer insulating layer 313, the second capacitor 332, the source electrode 321, and the drain electrode 322, and the planarization layer 317 includes a contact hole 319 that exposes the drain electrode 322.

The pixel electrode 341 formed of a transparent conductive material such as ITO or IZO is disposed on the planarization layer 317. The pixel electrode 341 is connected to the drain electrode 322 through the contact hole 319.

The intermediate layer 342 and the opposed electrode 343 are sequentially disposed on the pixel electrode 341.

A pixel defining layer 318 is formed in a portion where the pixel electrode 341, the intermediate layer 342, and the opposed electrode 343 are not formed on the planarization layer 317.

Herein, the substrate 300 may be a part of an article including the composite including the poly(amide-imide) copolymer and inorganic particles.

Hereafter, the embodiments of this disclosure are described in detail with reference to examples. The following examples and comparative examples are not restrictive but are illustrative.

EXAMPLES

Model Experiment

Determination of Reactivity between Imide Ring and Amino Silane

6FDA and TFDB are reacted to prepare a polyimide, and 3-aminopropyl triethoxysilane (APS) is added thereto for an amino group of the PAS to form bonding to a carbonyl group derived from an imide ring of the polyimide by decyclization (ring opening). FIG. 3 shows FT-IR spectroscopy of the product of the reaction. As shown from FIG. 3D, the product shows two peaks which were not observed in the polyimide before adding the APS. The peak at 1536 $cm^{-1}$ indicates the N—H bonding of the amide, and the peak at 1684 $cm^{-1}$ the C=O of the amide. This result shows that a decyclized imide ring of the polyimide forms a bonding with the APS.

SYNTHESIS EXAMPLE

Preparation of a Poly(imide-amide) Copolymer

In accordance with the following Synthesis Examples 1 to 3, poly(imide-amide) copolymers having the compositions as described in Table 1 are prepared.

Synthesis Example 1

Preparation of Poly(imide-amide) Copolymer (PAD-391-b)

Oligoamic Acid (Prepolymer A): 372.35 g (1.5 mol) of DADPS was dissolved in 1,000 g of DMAc in 3 L double walled reactor, equipped with mechanical stirrer and nitrogen inlet at 20° C. under nitrogen atmosphere. 444.25 g (1 mol) of 6-FDA and 224.9 g of DMAc were added. The reaction was carried out for 24 hrs at 20° C. to prepare oligomeric amic acid solution (40 weight %). Oligomer solution was stored in the refrigerator.

Amide Block (Prepolymer B): 2.3831 g (0.0096 mol) of DADPS and 3.0742 g (0.0096 mol) of TFDB were charged into 250 ml 4-neck double walled reactor, equipped with mechanical stirrer, nitrogen inlet, and 78 ml (73.233 g) of DMAc was added. Diamines solution was stirred until monomers were completely dissolved and then was cooled down (temperature of the cooling system was +5° C.) under nitrogen atmosphere. 2.6797 g (0.0096 mol) of biphenyl acid dichloride was added to the reaction mixture at a four divided steps for ~30 minutes. The temperature of cooling system was increased to 10° C. Then solution was stirred for additional 1 hour, and then prepolymer B was obtained.

Synthesis of Block Copolymer: 6.533 g of prepolymer A and 81 ml (75.731 g) of DMAc were added to the prepolymer B solution and cooled down (5° C. in the cooling system). 2.2739 g (0.0112 mol) of terephthalic acid chloride was added at four steps. The temperature of cooling system was increased to 10° C. and the reaction proceeded for 1 hr.

Chemical Imidization: Temperature was increased to 20° C., and 1.3067 g (0.0128 mol) of acetic anhydride was added. After stirring for 30 min 4.303 g (0.0544 mol) of pyridine was added, and reaction was carried out for additional 12 hrs.

Synthesis Example 2

Preparation of poly(imide-amide) Copolymer (PAD-697-b)

Oligoamic Acid (Prepolymer A-1: 372.35 g (1.5 mol) of DADPS was dissolved in 1000 g of DMAc in 3 L double walled reactor, equipped with mechanical stirrer and nitrogen inlet at 20° C. under nitrogen atmosphere. 444.25 g (1 mol) of 6-FDA and 224.9 g of DMAc were added. The reaction was carried out for 24 hrs at 20° C. to prepare oligomeric amic acid solution (40 weight %). Oligomer solution was stored in the refrigerator.

Oligoamic Acid (Prepolymer A-2): 22.3418 g (0.09 mol) of DADPS was dissolved in 70 g of DMAc in 250 ml double walled reactor, equipped with mechanical stirrer and nitrogen inlet at 20° C. under nitrogen atmosphere. 17.6534 g (0.06 mol) of BPDA and 23.3221 g of DMAc were added. The reaction was carried out for 24 hrs at 20° C. to prepare oligomeric amic acid solution (30 weight %). Oligomer solution was stored in the refrigerator.

Amide Block (Prepolymer B): 1.1916 g (0.0048 mol) of DADPS and 3.0742 g (0.0096 mol) of TFDB were charged into 250 ml 4-neck double walled reactor, equipped with mechanical stirrer, nitrogen inlet, and 60 ml (56.4804 g) of DMAc was added. Diamines solution was stirred until monomers were completely dissolved and then was cooled down (temperature of the cooling system was +5° C.) under nitrogen atmosphere. 2.0098 g (0.0072 mol) of biphenyl acid dichloride was added to the reaction mixture at a four divided steps for ~30 minutes. The temperature of cooling system was increased to 10° C. Then solution was stirred for additional 1 hour, and then prepolymer B was obtained.

Block Copolymer Synthesis: 6.5329 g of prepolymer A-1, 7.1102 g of prepolymer A-2 and 56 ml (52.8235 g) of DMAc were added to the prepolymer B solution and cooled down (5° C. in the cooling system). 2.1115 g (0.0104 mol) of terephthalic acid chloride was added at four steps. The temperature of cooling system was increased to 10° C. and the reaction proceeded for 1 hr.

Chemical Imidization: Temperature was increased to 20° C., and 2.6135 g (0.0256 mol) of acetic anhydride was added. After stirring for 30 min 3.4171 g (0.0432 mol) of pyridine was added, and reaction was carried out for additional 12 hrs.

Synthesis Example 3

Preparation of Poly(imide-amide) Copolymer (PAD-695-b)

Oligoamic Acid (Prepolymer a): 372.35 g (1.5 mol) of DADPS was dissolved in 1,000 g of DMAc in 3 L double walled reactor, equipped with mechanical stirrer and nitrogen inlet at 20° C. under nitrogen atmosphere. 444.25 g (1 mol) of 6-FDA and 224.9 g of DMAc were added. The reaction was carried out for 24 hrs at 20° C. to prepare oligomeric amic acid solution (40 weight %). Oligomer solution was stored in the refrigerator.

Oligoamic Acid (Prepolymer A-2): 19.2138 g (0.06 mol) of TFDB was dissolved in 50 g of DMAc in 250 ml double walled reactor, equipped with mechanical stirrer and nitrogen inlet at 20° C. under nitrogen atmosphere. 11.769 g (0.04 mol) of BPDA and 22.2932 g of DMAc were added. The reaction was carried out for 24 hrs at 20° C. to prepare oligomeric amic acid solution (30 weight %). Oligomer solution was stored in the refrigerator.

Amide Block (Prepolymer B): 3.0742 g (0.0096 mol) of TFDB were charged into 250 ml 4-neck double walled reactor, equipped with mechanical stirrer, nitrogen inlet, and 42 ml (44.1406 g) of DMAc was added. Diamine solution was stirred until monomers were completely dissolved and then was cooled down (temperature of the cooling system was +5° C.) under nitrogen atmosphere. 1.3399 g (0.0048 mol) of biphenyl acid dichloride was added to the reaction mixture at a four divided steps for ~30 minutes. The temperature of cooling system was increased to 10° C. Then solution was stirred for additional 1 hour, and then prepolymer B was obtained.

Block Copolymer Synthesis: 14.6988 g of prepolymer A-1, 6.1964 g of prepolymer A-2 and 79 ml (74.031 g) of DMAc were added to the prepolymer B solution and cooled down (5° C. in the cooling system). 1.9491 g (0.0096 mol) of terephthalic acid chloride was added at four steps. The temperature of cooling system was increased to 10° C. and the reaction proceeded for 1 hr.

Chemical Imidization: Temperature was increased to 20° C., and 3.9203 g (0.0384 mol) of acetic anhydride was added. After stirring for 30 min 5.3155 g (0.0672 mol) of pyridine was added, and reaction was carried out for additional 12 hrs.

The content and type of the poly(imide-amide) copolymers, the content of TMOS, the ratio of water to DMAc, and the content of silica used in Examples 1 to 6 are summarized in Table 2 below. As Comparative Examples 1 to 3, neither APS nor TMOS is added, but only the poly(imide-amide) copolymers prepared in Synthesis Examples 1 to 3 are used.

TABLE 2

| | Copolymer Solution (g)[a] | r-APS (g) | TMOS (g) | $H_2O$/DMAc (g)[b] | Silicone Content (g) | Gelation[c] |
|---|---|---|---|---|---|---|
| Ex. 1 | Syn. Ex. 1, 5 g | 0.057 | 0 | 0.0206 | 5 | X |
| Ex. 2 | Syn. Ex. 1, 5 g | 0.057 | 0.1568 | 0.0825 | 15 | X |
| Ex. 3 | Syn. Ex. 2, 5 g | 0.057 | 0 | 0.0206 | 5 | X |
| Ex. 4 | Syn. Ex. 2, 5 g | 0.057 | 0.1568 | 0.0825 | 15 | X |
| Ex. 5 | Syn. Ex. 3, 5 g | 0.057 | 0 | 0.0206 | 5 | X |
| Ex. 6 | Syn. Ex. 3, 5 g | 0.057 | 0.1568 | 0.0825 | 15 | X |
| Comp. Ex. 1 | Syn. Ex. 1 | — | — | — | — | X |
| Comp. Ex. 2 | Syn. Ex. 2 | — | — | — | — | X |
| Comp. Ex. 3 | Syn. Ex. 3 | — | — | — | — | X |

[a]Polymer solution: The solid content is 10 weight %.
[b]$H_2O$/DMAc = 40/60
[c]Determination of gelation after 1 hour maintenance As shown from Table 2, poly(imide-amide) copolymer nanocomposites including silica according to Examples 1 to 6 did not gelate after being held for 1 hour.

Film Fabrication: Coating and Drying

The copolymers according to the Examples and Comparative Examples are coated on a glass substrate by using doctor's blade to the thickness of 10 μm. The drying and curing processes are as follows:

TABLE 1

| | Imide Block 1 | | Imide Block 2 | | Amide Block | | | | Content of Imide |
|---|---|---|---|---|---|---|---|---|---|
| | dianhydride | diamine | dianhydride | diamine | diacid chloride | | diamine | | |
| Syn. Ex. 1 | 6FDA (6.67) | DADPS (10) | — | — | TPCI (23.33) | BPCI (20) | DADPS (20) | TFDB (20) | 20 |
| Syn. Ex. 2 | 6FDA (6.67) | DADPS (10) | BPDA (6.67) | DADPS (10) | TPCI (21.67) | BPCI (15) | DADPS (10) | TFDB (20) | 40 |
| Syn. Ex. 3 | 6FDA (15) | DADPS (22.5) | BPDA (5) | TFDB (7.5) | TPCI (20) | BPCI (10) | TFDB (20) | — | 60 |

* The unit of content is mol %.

Examples 1 to 6 and Comparative Examples 1 to 3

Preparation of Poly(imide-amide) Nanocomposite

3-Aminopropyl triethoxysilane (APS) is added to each of the poly(imide-amide) copolymer prepared in Synthesis Examples 1 to 3 to obtain each poly(imide-amide) copolymer according to Examples 1, 3, and 5, in which the silane compound is introduced to the side chain of the copolymer. In the copolymers, the content of APS is 0.057 g (5 weight % of $SiO_2$) based on each copolymer composition.

Then, the silica precursor TMOS (tetramethyl orthosilicate) and water are added to each of the prepared APS introduced poly(imide-amide) copolymers to prepare poly(imide-amide) nanocomposites according to Examples 2, 4, and 6.

Each film is pre-dried at 80° C. for 1 hour, and is moved to the furnace. In the furnace, the film is heat treated by raising temperature at 10 degrees Centigrade per minute ("° C./min") to 300° C. in nitrogen ($N_2$ gas) atmosphere, and is maintained for 1 hour at 300° C.

Evaluation

The films prepared are evaluated for the chemical resistance, optical properties (birefringence, transmittance, etc.), and thermal properties (CTE, Tg, Td).

(1) Chemical Resistance

Chemical resistance of the films is measured by immersing the films into acetone or PRS-2000 for 10 minutes at room temperature. Then the weight and appearance are measured before and after immersing the films. The results are shown in Table 3 below.

TABLE 3

| | Acetone | | PRS2000 | |
| --- | --- | --- | --- | --- |
| | Weight change (%) | Appearance change | Weight change (%) | Appearance change |
| Ex.1 | −0.1 | N.A. | 0.2 | N.A. |
| Ex.2 | 0.2 | N.A. | 0.1 | N.A. |
| Ex.3 | 0 | N.A. | 0 | N.A. |
| Ex.4 | 0.3 | N.A. | 0.3 | N.A. |
| Ex.5 | 0 | N.A. | 0 | N.A. |
| Ex.6 | 0.3 | N.A. | 0 | N.A. |
| Comp. Ex.1 | 10.5 | Swollen | 19.7 | Swollen, whitened |
| Comp. Ex.2 | 11.3 | Swollen | 15.6 | Swollen, whitened |
| Comp. Ex.3 | 9.4 | Swollen | −23.1 | Swollen, whitened |

As shown from Table 3, the films prepared by using the copolymers according to Examples 1 to 6 have improved resistance to acetone or PRS-2000. That is, the films show no change in weight or appearance, which shows that the films are very stable to the solvents or washing solutions.

On the contrary, all the films prepared by using the copolymers according to Comparative Examples 1 to 3 have been swollen and whitened, and show considerable weight changes.

Meanwhile, the composition of the copolymers of Comparative Example 1 and Examples 1 and 2 are the same, the composition of the copolymers of Comparative Example 2 and Examples 3 and 4 are the same, and the composition of the copolymers of Comparative Example 2 and Examples 3 and 4 are the same. Nevertheless, the characteristics of the films prepared by using the Comparative Examples and Examples are totally different from each other, as shown from Table 3.

(2) Birefringence Characteristics

The refractive indexes and birefringence of the nanocomposites are measured on prism coupler (Metricon MODEL 2010/M) at a wavelength of 633 nm. $R_{th}$ is calculated with the following equation:

$$R_{th} = \{n(TE) - n(TM)\} \times d$$

where n(TE) and n(TM) are in-plane and out of plane refractive indexes, and d is film thickness. The results are shown in Table 4 below.

TABLE 4

| | Δn, (n(TM)−n(TE)) | $R_{th}$, nm |
| --- | --- | --- |
| Example 1 | 0.0648 | 648 |
| Example 2 | 0.076 | 760 |
| Example 3 | 0.043 | 860 |
| Example 4 | 0.052 | 1092 |
| Example 5 | 0.0546 | 873 |
| Example 6 | 0.0463 | 879 |
| Comp. Example 1 | 0.0979 | 2447 |
| Comp. Example 2 | 0.0605 | 2359 |
| Comp. Example 3 | 0.0612 | 2258 |

As shown from Table 4, the films prepared by using the copolymers according to Examples 1 to 6 have reduced $R_{th}$ compared with the films prepared by using the copolymers according to Comparative Examples 1 to 3. Therefore, the films according to Examples 1 to 6 are very useful for the optical films, especially for the display substrate materials.

(3) Thermal and Optical Properties

The coefficient of thermal expansion (CTE), glass transition temperature (Tg), and polymer decomposition temperature (Td) of the films according to the Examples and Comparative Examples are determined by the following methods, and the results are shown in Tables 5 and 6 below.

(i) CTE is measured on TMA Q400 (TA Instruments, U.S.A.) with the following heating program. The value is obtained in the second scanning. The measurement range is 50~150° C., 50~250° C. and 50~300° C.

First scanning: 5 minute isothermal→rump to 300° C. at a heating rate of 5° C./min.→cooling to 40° C.

Second scanning: rump to 400° C. at a heating rate of 5° C./min.

(ii) TGA curves are measured by TGA Q800 (TA Instruments, U.S.A.) using 10 mg to 15 mg of samples in $Al_2O_3$ crucible heated from 25° C. to 600° C. at a heating rate of 10° C./min under nitrogen atmosphere with a gas flow rate of 70 mL/min. The polymer decomposition temperature (Td) is determined at the weight loss of 0.1%, 1%, and 5%.

TABLE 5

| | CTE, ppm/° C. | | | |
| --- | --- | --- | --- | --- |
| | 50~150° C. | 50~250° C. | 50~300° C. | Tg, ° C. |
| Example 1 | 14.58 | 22.36 | 26.54 | 327 |
| Example 2 | 12.16 | 15.54 | 16.98 | 362 |
| Example 3 | 19.82 | 25.9 | 41.45 | 320 |
| Example 4 | 18.03 | 24.87 | 34.81 | 348 |
| Com. Example 1 | 14.28 | 14.77 | 16.54 | 330 |
| Com. Example 2 | 18.54 | 24.53 | 26.46 | 348 |

TABLE 6

| | $T_d$ 1%, ° C. | $T_d$ 5%, ° C. |
| --- | --- | --- |
| Example 1 | 436 | 464 |
| Example 2 | 428 | 471 |
| Example 3 | 423 | 472 |
| Com. Example 1 | 438 | 468 |

As shown in Table 5, the CTEs of the films according to the embodiments are equivalent to or superior to those of the films according to the Comparative Examples in the ranges of 50~150° C. and 50~250° C., and are a little higher than those of the comparative examples.

Further, as shown from Table 6, the films according to the Examples and the Comparative Examples are equivalent to each other in the results of the thermal gravity analysis ("TGA") at the 1% decomposition temperature ($T_d$ 1%) and at the 5% decomposition temperature ($T_d$ 5%).

Meanwhile, the films according to Examples 1 to 5 have light transmittance of at least about 80%, for example at least about 84%, in the wavelength range of 380 nanometers to 700 nanometers, and have light transmittance of at least about 60%, for example, at least about 70%, at the wavelength of 430 nanometers. The haze of the films is less than or equal to about 1.0. These results show that the optical properties of the films according to the embodiments are generally equivalent to those of the films according to the Comparative Examples.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A poly(imide-amide) copolymer comprising a structural unit represented by Chemical Formula 1, a structural unit represented by Chemical Formula 2, and a structural unit represented by Chemical Formula 3:

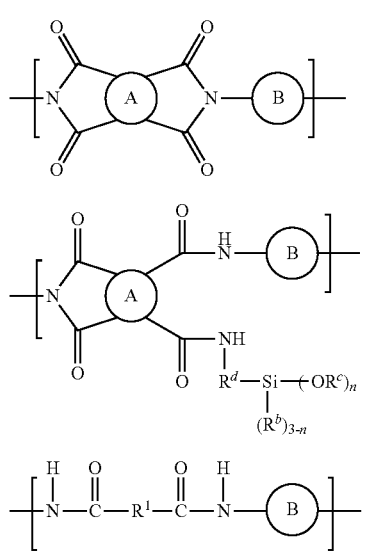

Chemical Formula 1

Chemical Formula 2

Chemical Formula 3 wherein in Chemical Formulae 1 to 3,

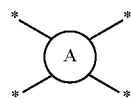

comprises a structural unit represented by at least one of Chemical Formula 8 and Chemical Formula 9:

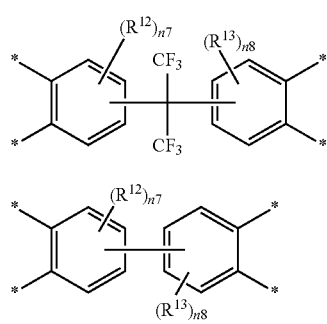

Chemical Formula 8

Chemical Formula 9 wherein in Chemical Formulae 8 and 9,
$R^{12}$ and $R^{13}$ are the same or different and each are independently a halogen, a hydroxyl group, a substituted or unsubstituted C1 to C10 aliphatic organic group, a substituted or unsubstituted C6 to C20 aromatic organic group, an alkoxy group of formula —$OR^{205}$, wherein $R^{205}$ is a C1 to C10 aliphatic organic group, a silyl group of formula —$SiR^{209}R^{210}R^{211}$, wherein $R^{209}$, $R^{210}$, and $R^{211}$ are the same or different and each are independently a hydrogen, or a C1 to C10 aliphatic organic group, and n7 and n8 are the same or different and each are independently an integer ranging from 0 to 3; and

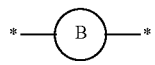

comprises a structural unit represented by Chemical Formula 6:

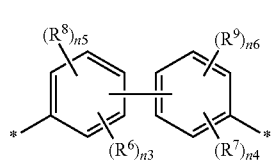

Chemical Formula 6 wherein in Chemical Formula 6,
$R^6$ and $R^7$ are the same or different and each are independently an electron withdrawing group,
$R^8$ and $R^9$ are the same or different, and each are independently a halogen, a hydroxy group, a substituted C1 to C10 aliphatic organic group, a substituted or unsubstituted C6 to C20 aromatic organic group, an alkoxy group of formula —$OR^{204}$, wherein $R^{204}$ is a C1 to C10 aliphatic organic group, or a silyl group of formula —$SiR^{205}R^{206}R^{207}$, wherein $R^{205}$, $R^{206}$, and $R^{207}$ are the same or different, and each are independently a hydrogen, a C1 to C10 aliphatic organic group,
n3 is an integer ranging from 1 to 4,
n5 is an integer ranging from 0 to 3,
provided that n3+n5 is an integer ranging from 1 to 4,
n4 is an integer ranging from 1 to 4, and
n6 is an integer ranging from 0 to 3,
provided that n4+n6 is an integer ranging from 1 to 4;
wherein in Chemical Formula 2,
$R^b$ and $R^c$ are the same or different and each are independently a hydrogen, a C1 to C20 alkyl, a C2 to C20 alkenyl, a C2 to C20 alkynyl, a C3 to C20 cycloalkyl, or a C6 to C18 aryl,
$R^d$ is a substituted or unsubstituted alkylene, a substituted or unsubstituted alkenylene, a substituted or unsubstituted alkynylene, a substituted or unsubstituted cycloalkylene, a substituted or unsubstituted cycloalkenylene, a substituted or unsubstituted cycloalkynylene, a substituted or unsubstituted arylene, or a substituted or unsubstituted aralkylene, and
n is an integer of 1 to 3; and
wherein in Chemical Formula 3,
$R^1$ is a combination of the following chemical formulae:

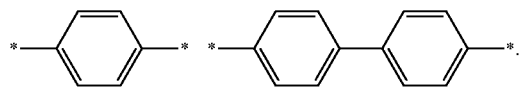

2. The poly (imide-amide) copolymer according to claim 1, wherein $R^6$ and $R^7$ in Chemical Formula 6 are the same or different, and are each independently selected from —$CF_3$, —$CCl_3$, —$CBr_3$, —$Cl_3$, —$NO_2$, —$CN$, —$COCH_3$, and —$CO_2C_2H_5$.

3. The poly (imide-amide) copolymer according to claim 1, wherein the structural units represented by Chemical Formula 1 or Chemical Formula 2, and the structural unit represented by Chemical Formula 3 are present in a mole ratio of about 5 to about 55 : about 95 to about 45.

4. The poly (imide-amide) copolymer according to claim 1, wherein the structural unit represented by Chemical Formula 1 and the structural unit represented by Chemical Formula 2 are present in a mole ratio of about 99 to about 1 : about 1 to about 99.

5. A composition comprising a poly(imide-amide) copolymer according to claim 1, and an inorganic particle or a precursor thereof.

6. The composition according to claim 5, wherein the inorganic particle or precursor thereof is an oxide or a hydroxide of at least one element selected from Ti, Si, Al, Zr, Sn, B, and Ce, or a precursor of the oxide or hydroxide.

7. The composition according to claim 5, wherein the inorganic particle is silica or titania.

8. The composition according to claim 6, wherein the precursor of the silica comprises tetraethyl orthosilicate, tetramethyl orthosilicate, or a compound represented by Chemical Formulae 10 to 12:

Chemical Formula 10

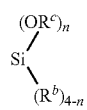

wherein in Chemical Formula 10, $R^b$ and $R^c$ are the same or different, and are each independently a hydrogen, a C1 to C20 alkyl, a C2 to C20 alkenyl, a C2 to C20 alkynyl, a C3 to C20 cycloalkyl, or a C6 to C18 aryl, and n is an integer of 1 to 3, Chemical Formula 11

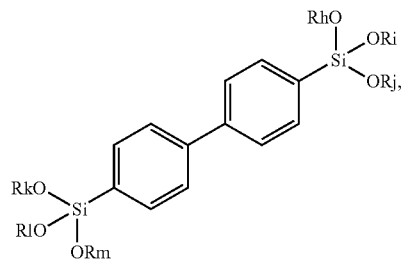

Chemical Formula 12

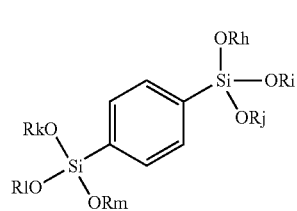

wherein Chemical Formulae 11 and 12, $R_h$ to $R_m$ are the same or different, and are each independently a C1 to C20 alkyl, a C2 to C20 alkenyl, a C2 to C20 alkynyl, a C3 to C20 cycloalkyl, or a C6 to C18 aryl.

9. The composition according to claim 5, wherein an amount of the inorganic particle or the precursor thereof is about 1 weight % to about 60 weight % based on the amount of the copolymer.

10. An article prepared by curing the poly(imide-amide) copolymer according to claim 1 or the composition according to claim 5.

11. The article according to claim 10, wherein the article comprises a poly(imide-amide) copolymer represented by Chemical Formula 13:

Chemical Formula 13

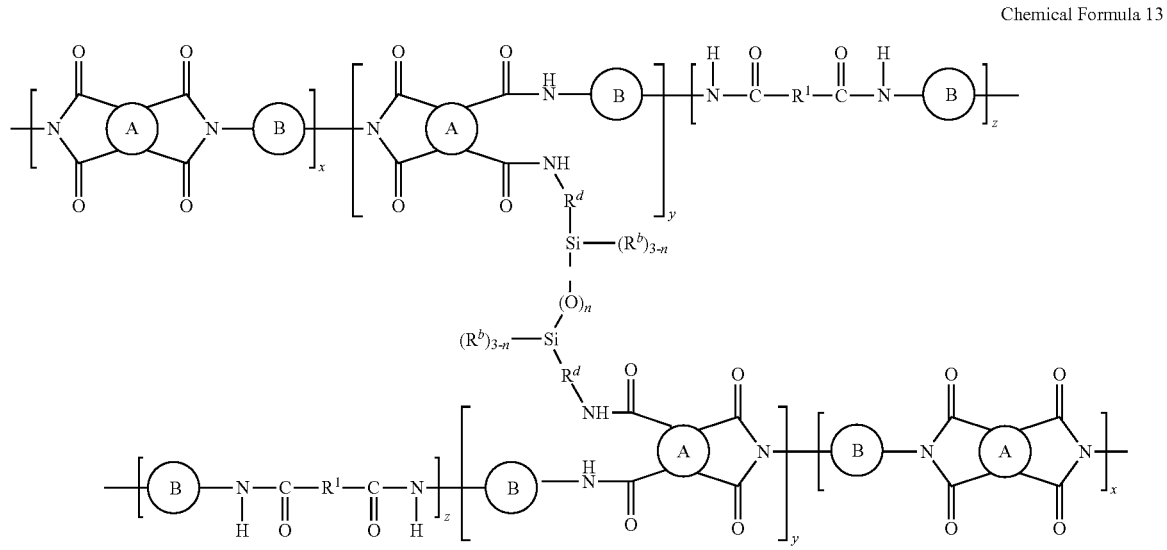

wherein in Chemical Formula 13,
each substituent and group of the poly(imide-amide) copolymer is as defined in Chemical Formulae 1 to 3, and
x, y, and z are mole fractions of respective structural units, wherein the mole ratio of (x+y) : z is about 5 to about 55 : about 95 to about 45.

12. The article according to claim 10, wherein the article comprises a poly(imide-amide) copolymer represented by Chemical Formula 14:

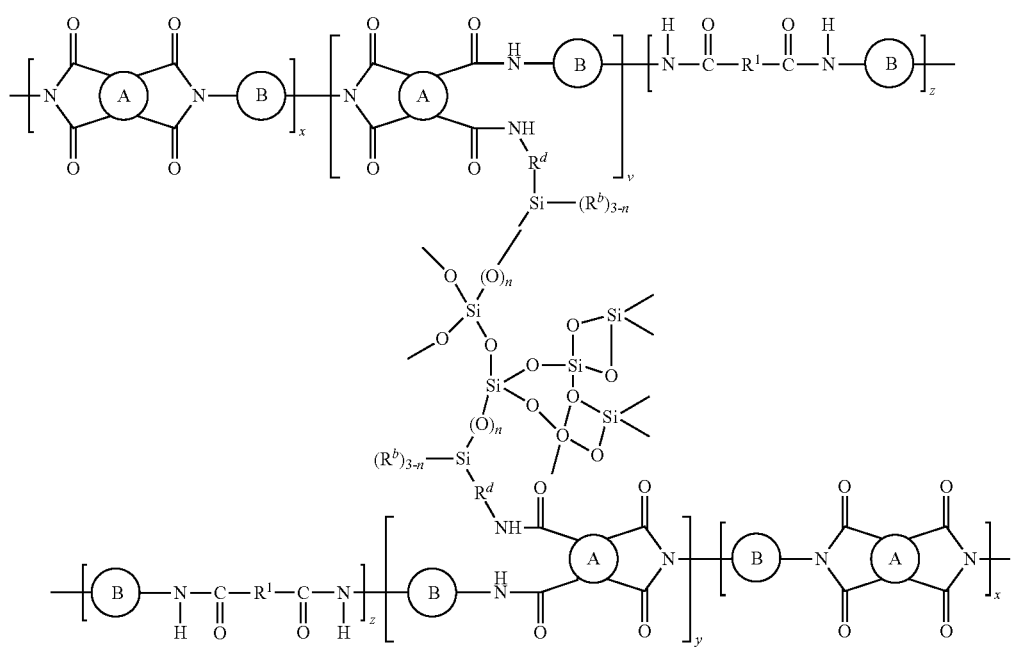

wherein in Chemical Formula 14,
each substituent and group of the poly(imide-amide) copolymer is as defined in Chemical Formulae 1 to 3, and
x, y, and z are mole fractions of respective structural units, wherein the mole ratio of (x+y) : z is about 5 to about 55 : about 95 to about 45.

13. A method of preparing an article comprising:
preparing a poly(imide-amide) copolymer comprising a structural unit represented by Chemical Formula 1 and a structural unit represented by Chemical Formula 3,
adding a silane compound represented by Chemical Formula 15 to the poly(imide-amide) copolymer, thereby introducing the silane compound to a side chain of a structural unit represented by the Chemical Formula 1 to form a structural unit represented by Chemical Formula 2, and thereby obtaining a poly(imide-amide) copolymer comprising a structural unit represented by Chemical Formula 1, a structural unit represented by Chemical Formula 2, and a structural unit represented by Chemical Formula 3,
introducing inorganic particles or a precursor thereof to the poly(imide-amide) copolymer comprising a structural unit represented by Chemical Formula 1, a structural unit represented by Chemical Formula 2, and a structural unit represented by Chemical Formula 3 to produce a poly(imide-amide) nano composite composition, and curing the poly(imide-amide) nano composite composition to provide the article:

Chemical Formula 1

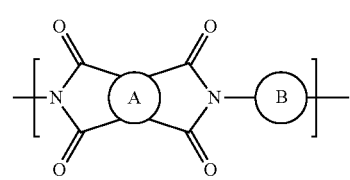

-continued

Chemical Formula 2

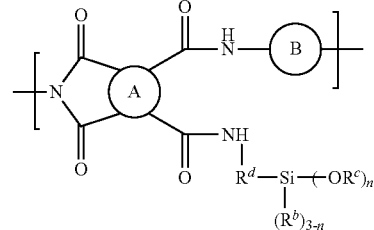

Chemical Formula 3

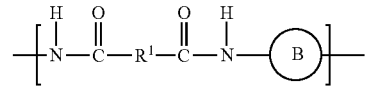

wherein in Chemical Formulae 1 to 3,

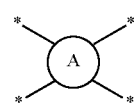

comprises a structural unit represented by at least one of Chemical Formula 8 and Chemical Formula 9:

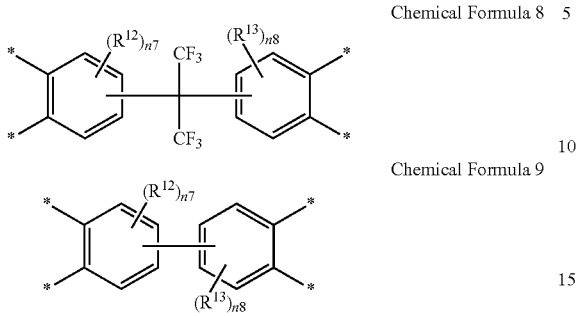

Chemical Formula 8

Chemical Formula 9 wherein in Chemical Formulae 8 and 9, $R^{12}$ and $R^{13}$ are the same or different and each are independently a halogen, a hydroxyl group, a substituted or unsubstituted C1 to C10 aliphatic organic group, a substituted or unsubstituted C6 to C20 aromatic organic group, an alkoxy group of formula —$OR^{205}$, wherein $R^{205}$ is a C1 to C10 aliphatic organic group, a silyl group of formula —$SiR^{209}, R^{210}, R^{211}$, wherein $R^{209}$, $R^{210}$, and $R^{211}$ are the same or different and each are independently a hydrogen, or a C1 to C10 aliphatic organic group, and n7 and n8 are the same or different and each are independently an integer ranging from 0 to 3;

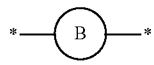

comprises a structural unit represented by Chemical Formula 6:

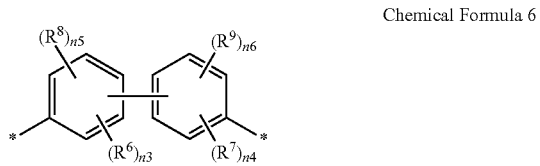

Chemical Formula 6 wherein in Chemical Formula 6, $R^6$ and $R^7$ are the same or different and each are independently an electron withdrawing group, $R^8$ and $R^9$ are the same or different, and each are independently a halogen, a hydroxy group, a substituted or unsubstituted C1 to C10 aliphatic organic group, a substituted or unsubstituted C6 to C20 aromatic organic group, an alkoxy group of formula —$OR^{204}$, wherein $R^{204}$ is a C1 to C10 aliphatic organic group, or a silyl group of formula —$SiR^{205}R^{206}R^{207}$, wherein $R^{205}$, $R^{206}$, and $R^{207}$ are the same or different, and each are independently a hydrogen, a C1 to C10 aliphatic organic group, n3 is an integer ranging from 1 to 4, n5 is an integer ranging from 0 to 3, provided that n3+n5 is an integer ranging from 1 to 4, n4 is an integer ranging from 1 to 4, and n6 is an integer ranging from 0 to 3, wherein in Chemical Formula 2, $R^b$ and $R^c$ are the same or different and each are independently a hydrogen, a C1 to C20 alkyl, a C2 to C20 alkenyl, a C2 to C20 alkynyl, a C3 to C20 cycloalkyl, or a C6 to C18 aryl, $R^d$ is a substituted or unsubstituted alkylene, a substituted or unsubstituted alkenylene, a substituted or unsubstituted alkynylene, a substituted or unsubstituted cycloalkylene, a substituted or unsubstituted cycloalkenylene, a substituted or unsubstituted cycloalkynylene, a substituted or unsubstituted arylene, or a substituted or unsubstituted aralkylene, and n is an integer of 1 to 3; and wherein in Chemical Formula 3, $R^1$ is a combination of the following chemical formulae:

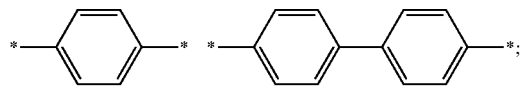

and

Chemical Formula 15 wherein in Chemical Formula 15, $R^b$, $R^c$, and $R^d$ are as defined in Chemical Formula 2, and n is an integer of 1 to 3.

14. The method according to claim 13, wherein the article is a film, and wherein the curing the poly(imide-amide) nanocomposite composition comprises:

coating the poly(imide-amide) nanocomposite composition on a substrate to produce a belt film, and curing the belt film.

15. The method according to claim 14, further comprising:

separating the belt film from the substrate, and heat treating the belt film separated from the substrate to form a cured film roll.

16. A display device comprising the article according to claim 10.

17. The poly(imide-amide) copolymer according to claim 1, wherein

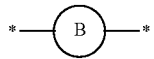

further comprises a structural unit represented by Chemical Formula 7:

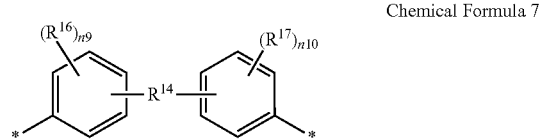

Chemical Formula 7 wherein in Chemical Formula 7, $R^{14}$ is O, S, C(=O), CH(OH), S(=O)$_2$, Si(CH$_3$)$_2$, (CH$_2$)$_p$ wherein $1 \le p \le 10$, (CF$_2$)$_q$ wherein $1 \le p \le 10$, C(CH$_3$)$_2$, $C(CF_3)_2$, $C(=O)NH$, or a substituted or unsubstituted C6 to C30 aromatic organic group, wherein the aromatic organic group comprises one aromatic ring, two or more aromatic rings fused together to provide a condensed ring system, or two or more moieties linked through a single bond or through a functional group selected from a fluorenylene group, O, S, $C(=O)$, $CH(OH)$, $S(=O)_2$, $Si(CH_3)_2$, $(CH_2)_p$, wherein $1 \leq p \leq 10$, $(CF_2)_c$, wherein $1 \leq p \leq 10$, $C(CH_3)_2$, $C(CF_3)_2$, and $C(=O)NH$, $R^{16}$ and $R^{17}$ are the same or different, and each are independently a halogen, a hydroxy group, a substituted or unsubstituted C1 to C10 aliphatic organic group, a substituted or unsubstituted C6 to C20 aromatic organic group, an alkoxy group of formula —$OR^{212}$, wherein $R^{212}$ is a C1 to C10 aliphatic organic group, or a silyl group of formula —$SiR^{213}R^{214}R^{215}$, wherein $R^{213}$, $R^{214}$, and $R^{215}$ are the same or different, and each are independently a hydrogen or a C1 to C10 aliphatic organic group, and n9 and n10 are each independently an integer ranging from 0 to 4.

\* \* \* \* \*